July 7, 1959 G. BAECHLI 2,893,539
PORTABLE EXTENSIBLE BELT CONVEYOR
Original Filed May 11, 1951 13 Sheets-Sheet 1
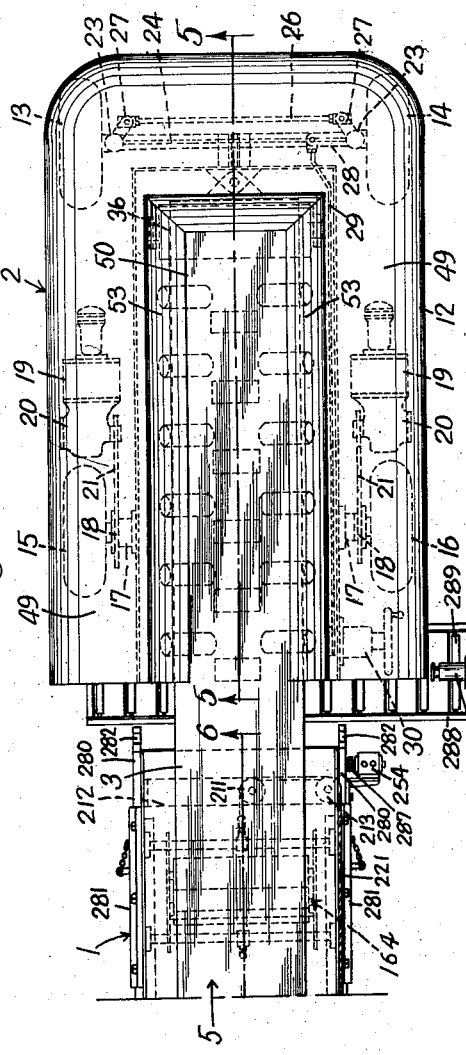
Inventor:
George Baechli.
by *[signature]*
Attorney.

July 7, 1959  G. BAECHLI  2,893,539
PORTABLE EXTENSIBLE BELT CONVEYOR
Original Filed May 11, 1951  13 Sheets-Sheet 2
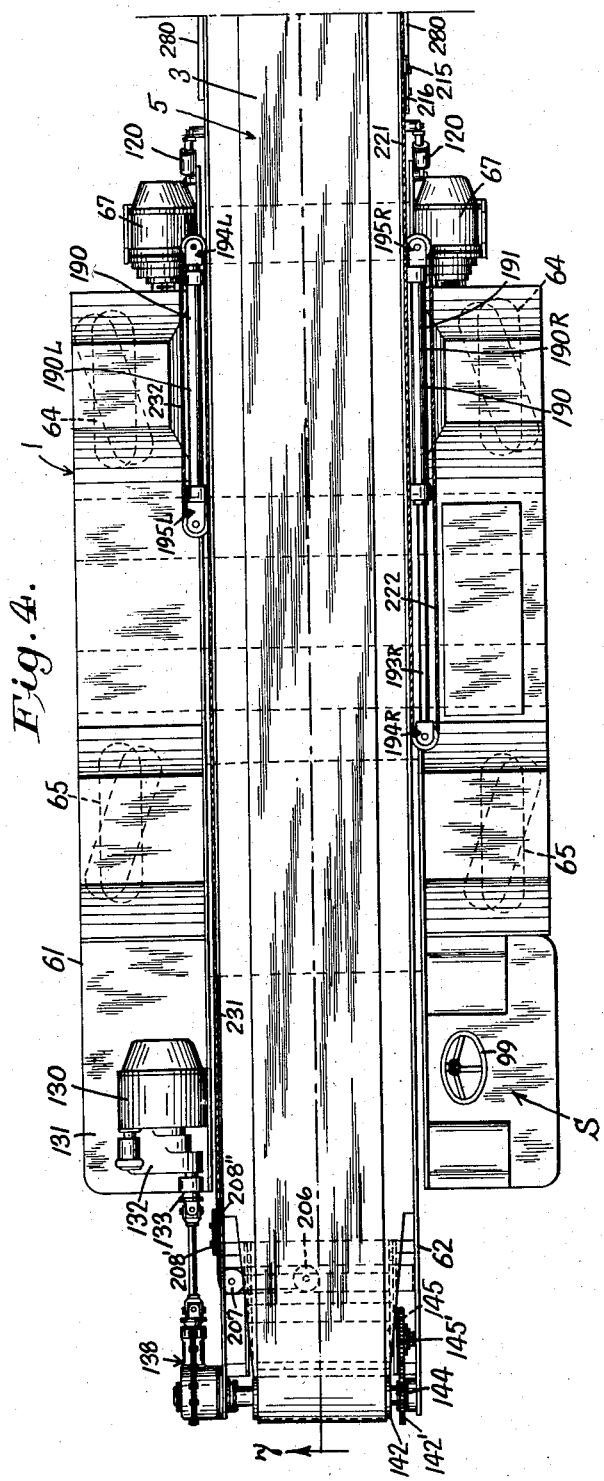
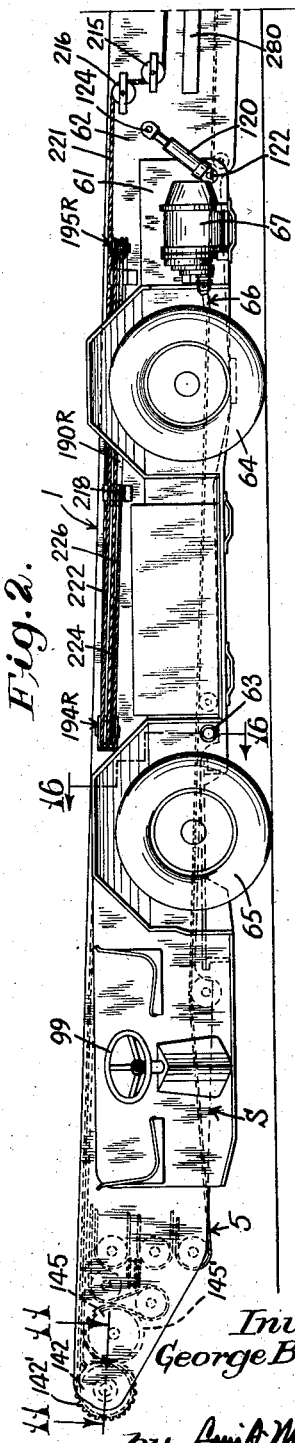
Inventor:
George Baechli
by [signature]
Attorney.

July 7, 1959
G. BAECHLI
2,893,539
PORTABLE EXTENSIBLE BELT CONVEYOR
Original Filed May 11, 1951
13 Sheets-Sheet 3
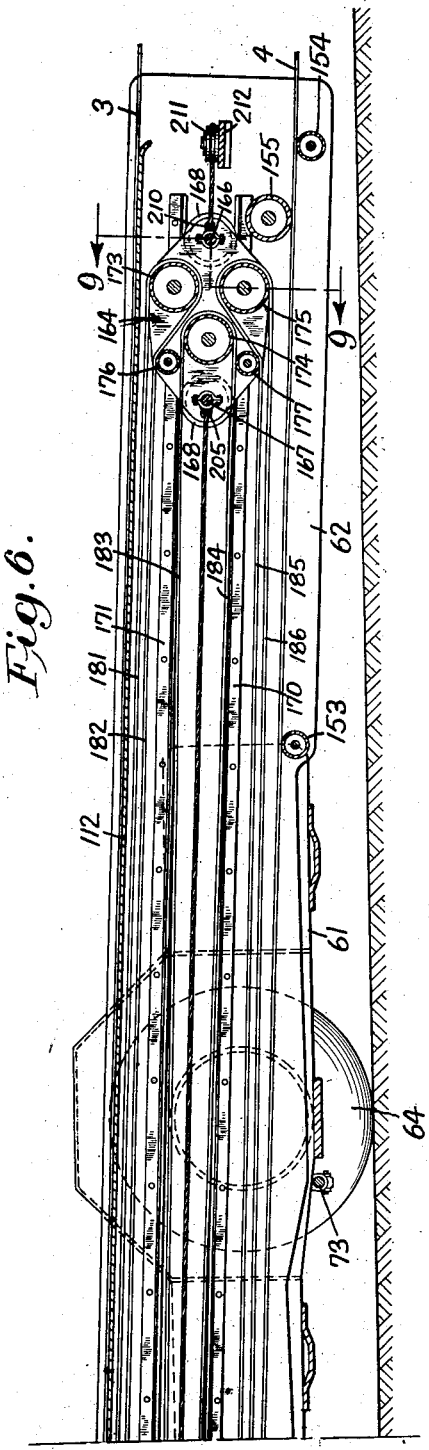
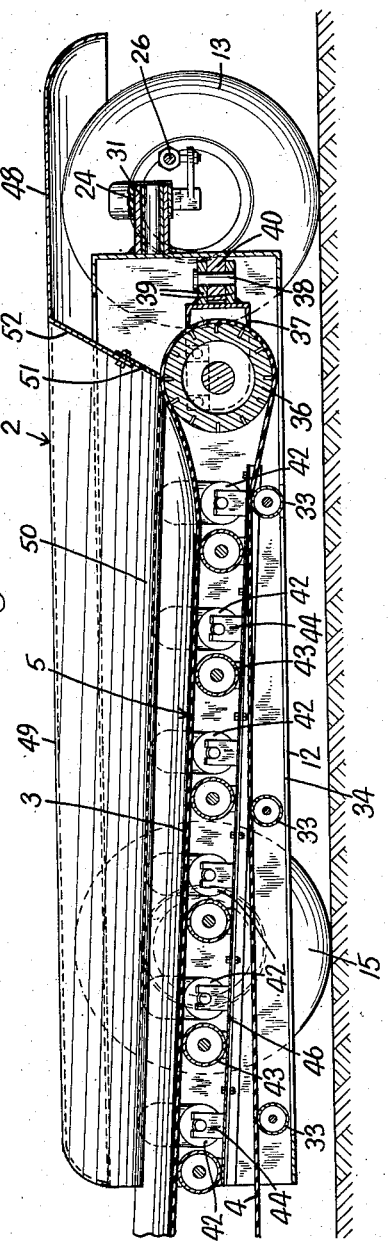
Inventor:
George Baechli,
by Louis A. Maxom.
Attorney.

July 7, 1959
G. BAECHLI
2,893,539
PORTABLE EXTENSIBLE BELT CONVEYOR
Original Filed May 11, 1951
13 Sheets-Sheet 4
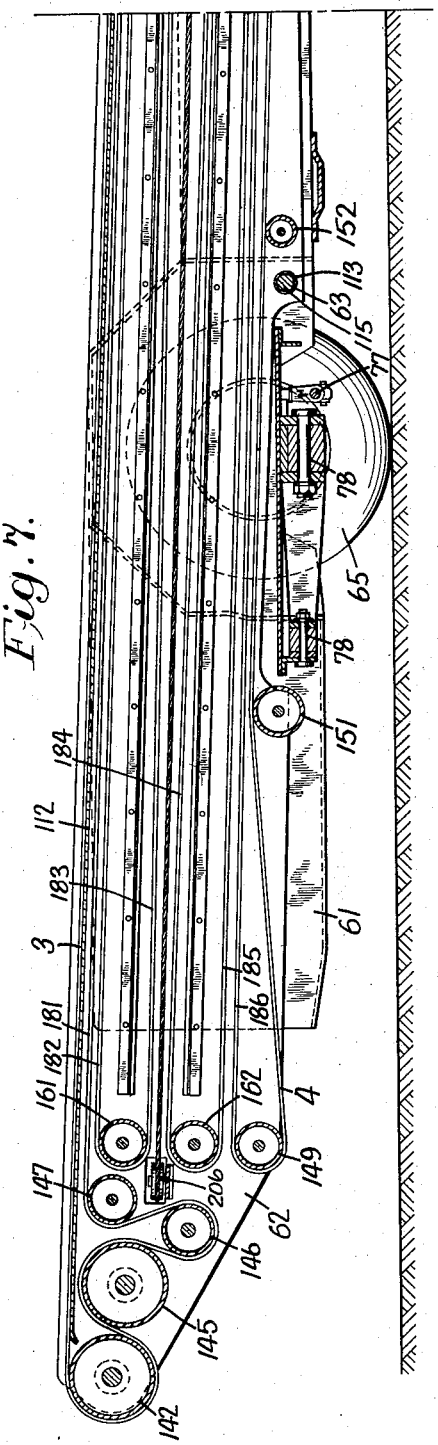
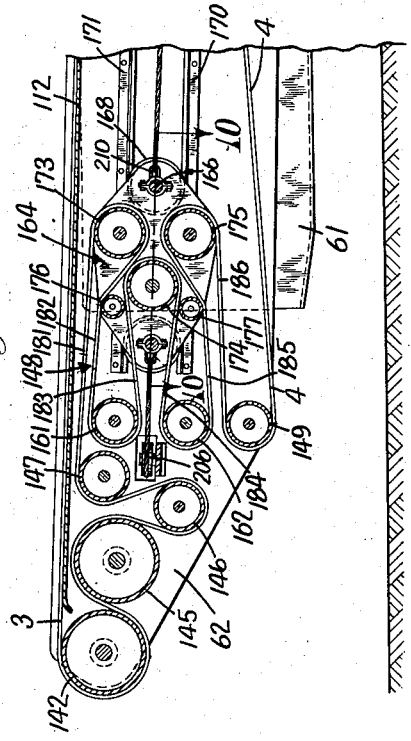
Inventor:
George Baechli.
by Louis A. Maxson.
Attorney.

Inventor.
George Baechli.

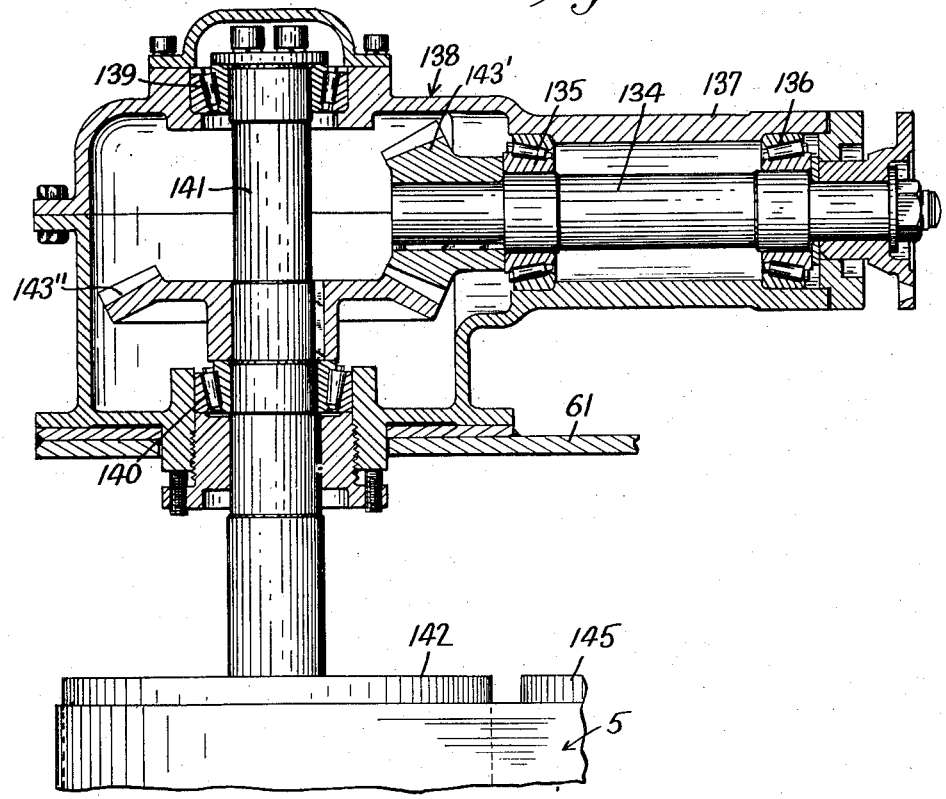
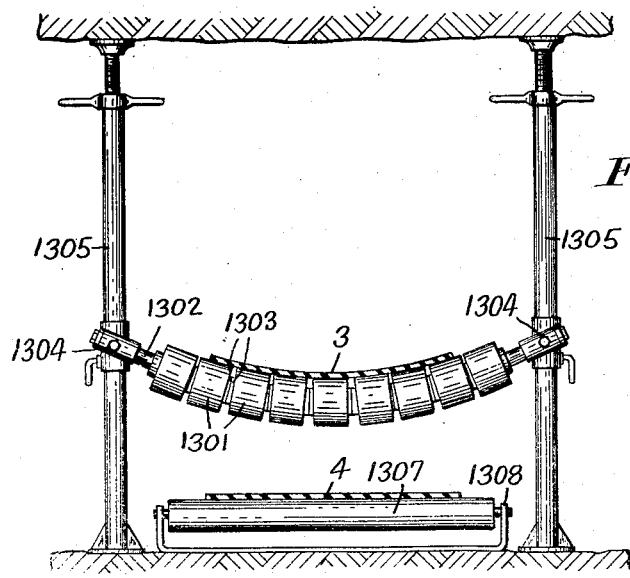

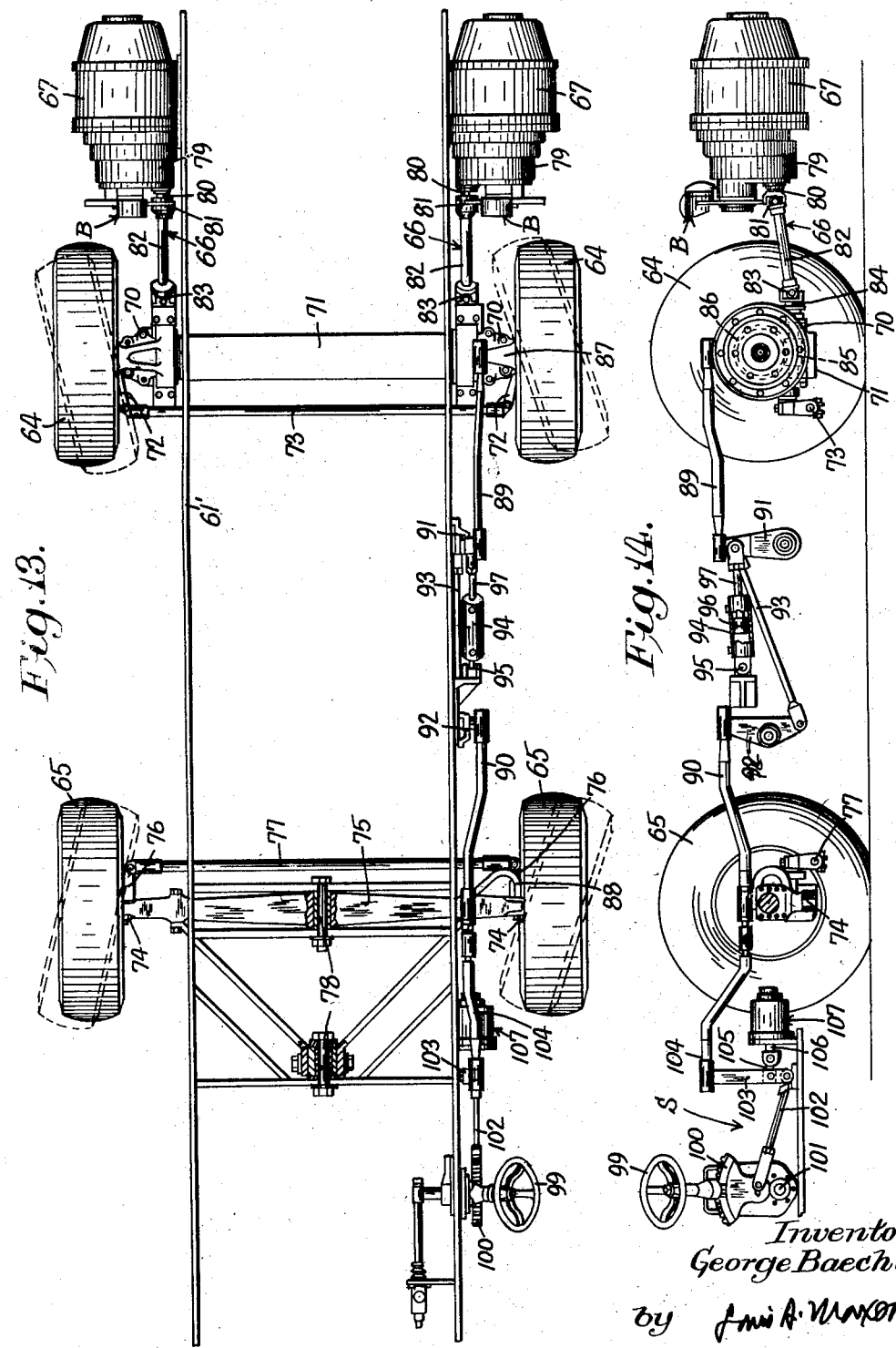

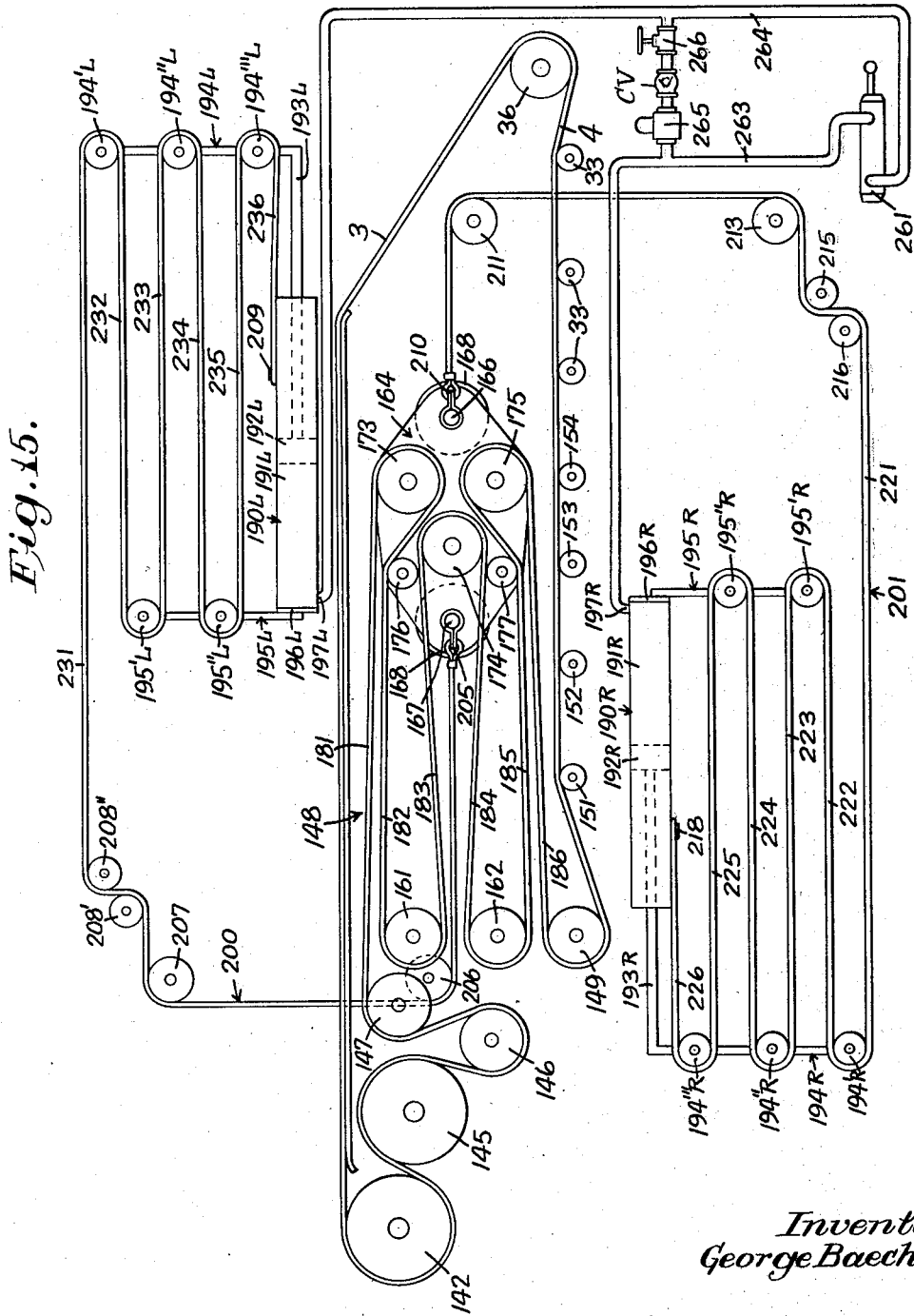

July 7, 1959  G. BAECHLI  2,893,539
PORTABLE EXTENSIBLE BELT CONVEYOR
Original Filed May 11, 1951  13 Sheets-Sheet 9
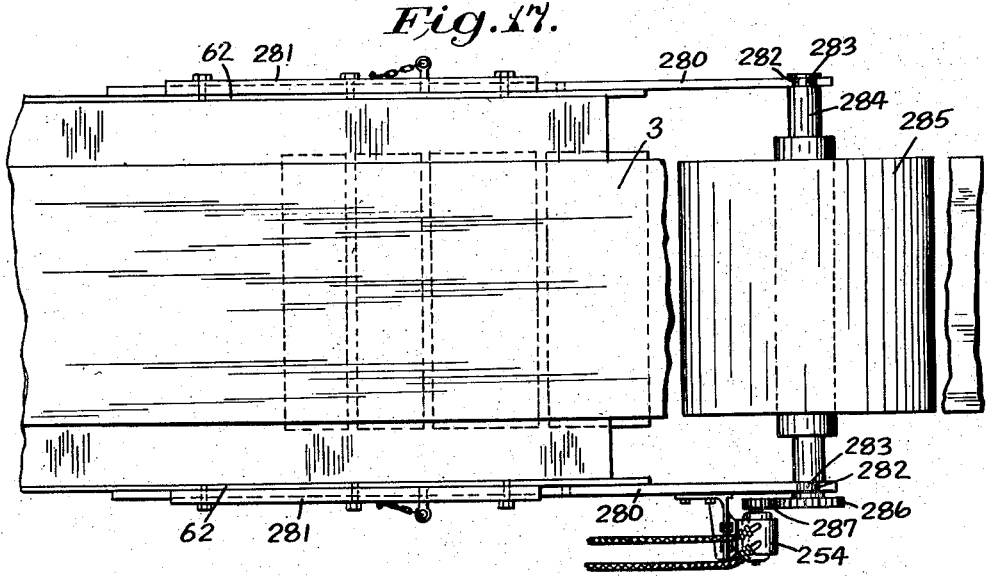
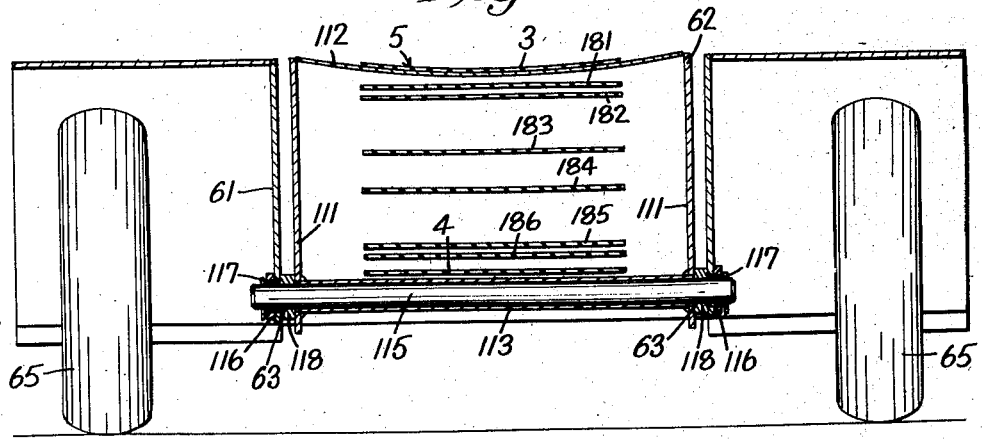
Inventor:
George Baechli.
by Lewis A. Maxon.
Attorney July 7, 1959  G. BAECHLI  2,893,539
PORTABLE EXTENSIBLE BELT CONVEYOR
Original Filed May 11, 1951  13 Sheets-Sheet 10

Inventor:
George Baechli.
by [signature]
Attorney.

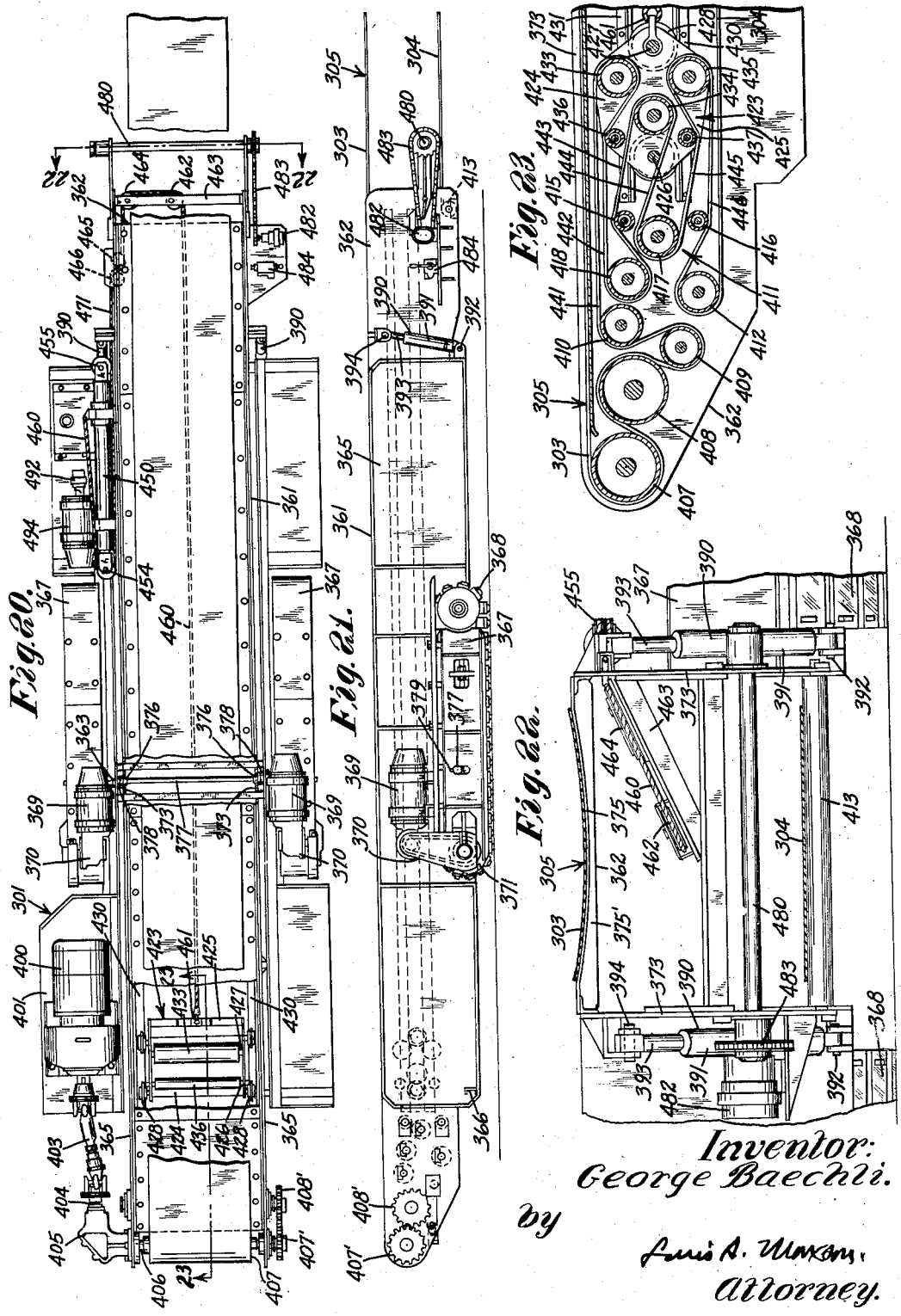

July 7, 1959  G. BAECHLI  2,893,539
PORTABLE EXTENSIBLE BELT CONVEYOR
Original Filed May 11, 1951  13 Sheets-Sheet 12
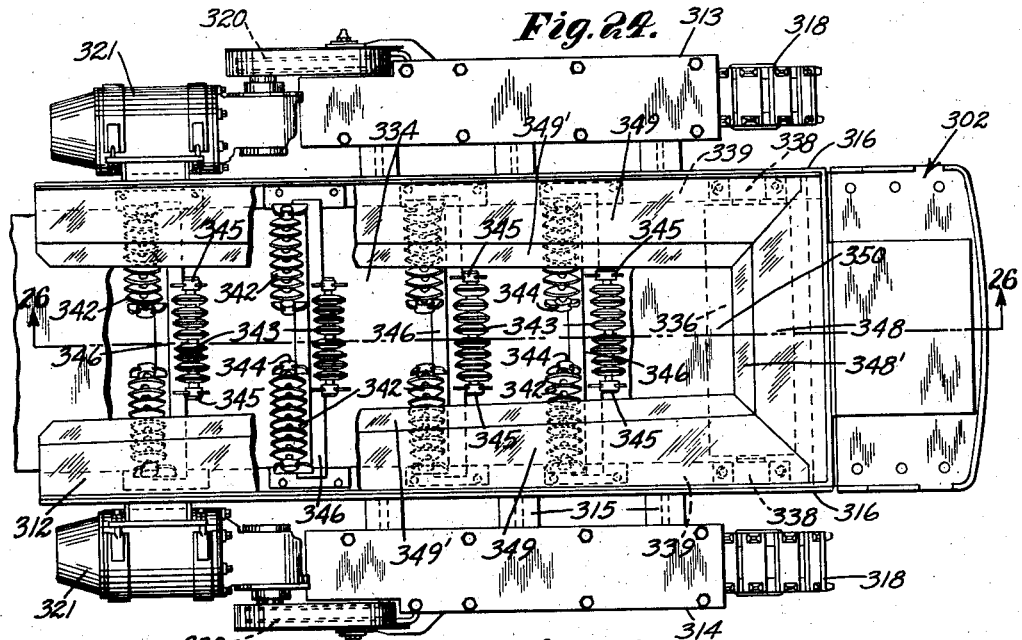
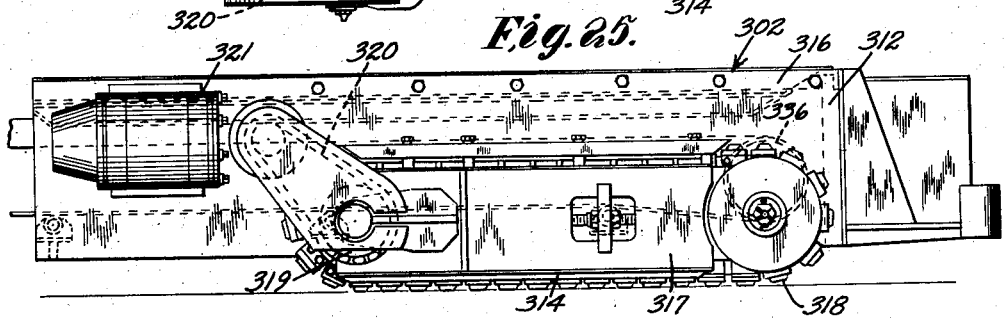
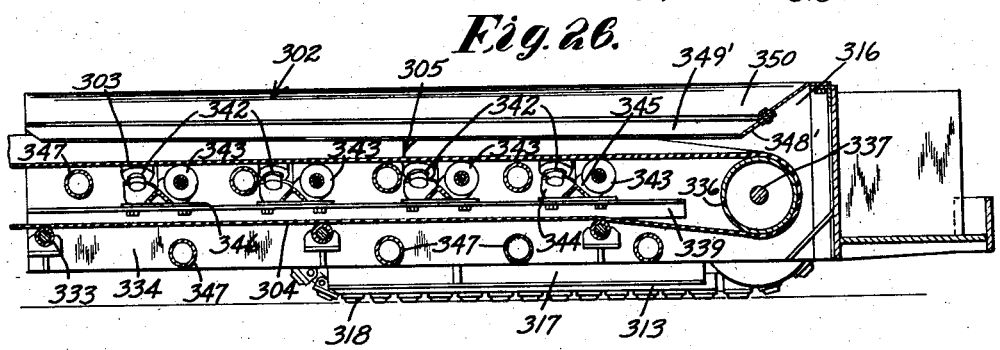
Inventor:
George Baechli.

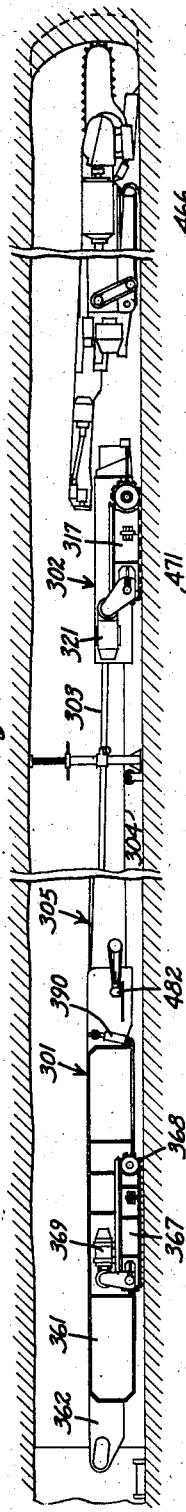
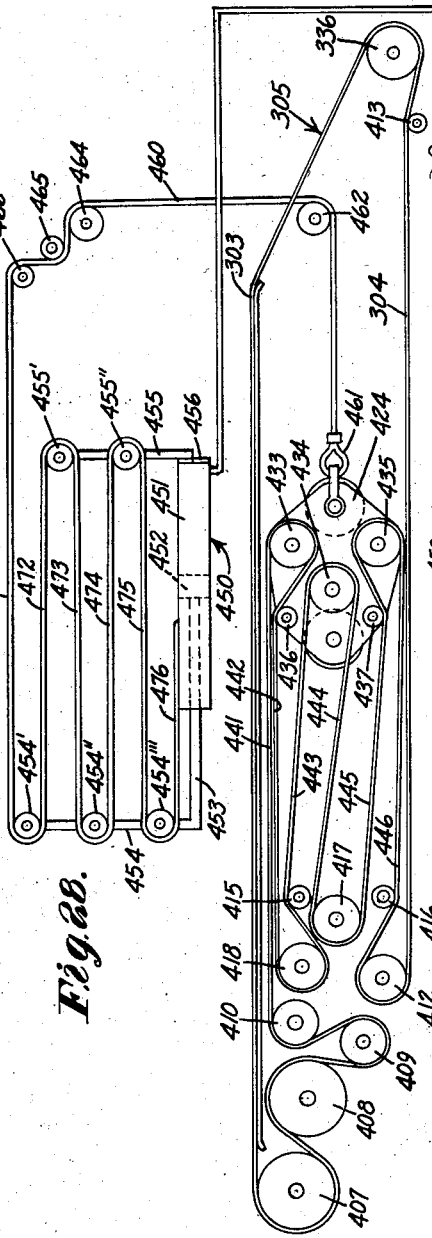
July 7, 1959     G. BAECHLI     2,893,539
PORTABLE EXTENSIBLE BELT CONVEYOR
Original Filed May 11, 1951     13 Sheets-Sheet 13
Inventor:
George Baechli.
By
Attorney.

United States Patent Office 2,893,539
Patented July 7, 1959

2,893,539
PORTABLE EXTENSIBLE BELT CONVEYOR

George Baechli, New Philadelphia, Ohio, assignor to Joy Manufacturing Company, Pittsburgh, Pa., a corporation of Pennsylvania Continuation of abandoned application Serial No. 225,791, May 11, 1951. This application October 11, 1956, Serial No. 616,117

29 Claims. (Cl. 198—139)

My invention relates to portable extensible conveyor devices.

The development of the "Continuous Miner" has added a new problem to the field of mining coal and other minerals that can be disintegrated by such equipment, in that the relatively steady, high rate of production makes necessary, for the removal of the disintegrated material from the delivery conveyor of the "Miner" and its transport to the main conveying system of the portion of the mine where the "Miner" is working, facilities superior to those that have been adequate for use with cutting, shooting and loading cycles. One reason why the problem has been magnified is the relatively rapid rate of advance of the "Miner." It may be easily possible, so far as the disintegrating action is concerned, to mine out vertical strips of coal thirty inches wide, eighteen inches deep; and more than six feet in height in materially less than a minute, and to drive a room or entry several such strips wide at the rate of one hundred twenty feet per eight-hour shift, and for any system of material conveying such as conventional shaker conveyors, mine floor supported belt conveyors, etc. the necessity for repeated lengthenings, by the addition of relatively short extensions, would be a severe handicap to maximum production. I have accordingly sought to minimize the number of extensions of the conveying apparatus, and have provided, through my invention, an arrangement whereby the number of extensions by the insertion of additional sections of conveyor is much reduced as compared with other types of apparatus. While an arrangement of the character to be described is of considerable overall length per se, and of considerably greater length when lined up behind the "Miner," the whole apparatus, "Miner" and conveyor devices, could be located in the chain pillar between two butt or panel entries, and the centers of the butt and panel entries may be so adjusted that there is room for the conveyor devices and a "Continuous Miner" preparing to start an attack on a seam, between the mother belt and the wall of the entry furthest removed from the mother belt at the time of the actual beginning of the attack on the seam.

In preferred embodiments, the conveyor devices may include two vehicles, desirably a larger, rearward one and a smaller forward one. Each of these vehicles will desirably be steerable and have propulsion means, though the forward vehicle may be hitched to the "Miner" for movement forwardly with the latter. The larger, outer vehicle will perform the function of a belt storage and driving unit, and may be called a drive buggy, while the smaller, forward one will act as a take-up buggy and provide a material-receiving hopper for the reception of disintegrated material from the "Miner," which it would immediately follow. A continuous run of belt will extend around a forward belt guiding roll on the take-up buggy and the forward portion of its top run will desirably be well supported by belt idler rolls, as material will be discharged onto it. The upper run will extend between the take-up and drive buggies, and will be suitably guided and supported on the latter—desirably by a long metallic trough—at the rear end of which there will be arranged a drive roll, which may, since the drive buggy will not normally advance as the apparatus follows up, with its take-up buggy portion, the "Miner," overlie and discharge to the mother belt conveyor. The belt will pass over a roll system designed to promote the efficiency of drive and will be guided forwardly to a suitably guided and supported movable roll cluster between which and a number of pulleys rotating on stationary axes near the outer end of the drive buggy the belt will pass back and forth, until a run thereof passes forward over the remainder of the length of the drive buggy and to the take-up buggy, with the lower belt run on which it is connected. With an arrangement such as has been briefly outlined, it will be evident that a large amount of belt can be stored on the drive buggy when the movable roll cluster is adjacent the inner end of the buggy. And it will be evident that if the take-up buggy moves forward there will be an approach of the movable roll cluster to the stationary rolls, and an elongation of the upper and lower belt runs extending between the buggies. To maintain the movable roll cluster normally as far as is compatible with the momentary circumstances, from the stationary rolls, there is provided, in the preferred embodiment, a hydraulic cylinder and cable system for resisting movement of the movable cluster rearwardly on the drive buggy but allowing its rearward movement under sufficient traction on the belt, and the pressure in the hydraulic cylinder arrangement will be adequate to sustain the belt load, and there will be provided means whereby advancing movements of the take-up buggy can be effected without operator intervention in the control of the hydraulic cylinder and cable apparatus. If desired, there may be provided also means whereby the movable cluster may be moved hydraulically rearwardly on the drive buggy under operator control.

The drive buggy will desirably have the belt mechanism hereinabove mentioned, save only the main driving motor and the fluid pump, supported upon an elongated frame for tilting about a transverse axis. In certain embodiments of the invention, this frame can be so controlled as to enable its forward end—its end nearer the take-up buggy—to rest upon the mine floor during material conveying operation, and to be lifted for transport and during the addition or removal of extra belt lengths. Suitable means will be provided for the addition of belt to the conveyor system and for its removal at will. The upper strand of belt may be supported between the buggies by prop-supported idler rolls, and other idler rolls may be dropped on the mine floor at suitable intervals between the buggies to support the lower belt run.

The general objects of this invention are to improve the construction, and in consequence the operation, of devices for handling coal or other distintegrated solid minerals behind an apparatus which delivers large quantities of disintegrated material and which frequently moves forward, with the necessity for the attendant material handling devices to move forward in substantial step with the material supplying apparatus; to provide an improved extensible conveyor system which has a relatively long range of extension; which has improved means for taking in relatively long lengths of belt to increase its reach (or for enabling the removal of such belt sections); which automatically maintains needed belt tension; and which through the use of belt-connected take-up and drive buggies, the first following closely a source of material to be handled and the latter remaining stationary at a delivery point, meets most effectively the problem of handling the mineral detached by "Continuous Miners."

In the accompanying drawings, in which there are shown two illustrative embodiments which the invention may assume in practice, and in which Figs. 1–19 disclose an embodiment and Figs. 20–29 disclose another, Figs. 1 and 2, taken together, provide a side elevation of belt connected drive and take-up buggies;

Figs. 3 and 4, taken together, provide a plan view of the drive and take-up buggies of Figs. 1 and 2, and show an extra roll of conveyor belt adjacent the point where belt is added to or removed from the extensible conveying apparatus;

Fig. 5 is a longitudinal, vertical section, on an enlarged scale, and on the plane of the line 5—5 of Fig. 3, through the take-up buggy;

Figs. 6 and 7, taken together, constitute a longitudinal, vertical section on an enlarged scale, and on the plane of the line 6—7 of Figs. 3 and 4, through the drive buggy;

Fig. 8 is a fragmentary section on the same plane as Fig. 7, showing the outer end of the drive buggy with the movable belt cluster thereof in the position occupied when the belt is fully payed out;

Fig. 11 is a much enlarged, fragmentary, substantially horizontal section on the plane of the line 11—11 of Fig. 2, showing details of the belt drive upon the drive buggy;

Fig. 12 is an elevational view of belt supporting devices used to support the active and return runs of the belt between the take-up buggy and the drive buggy, the view being taken transverse to the direction in which the belts extend;

Figs. 13 and 14 are respectively horizontal and vertical sectional views showing the supporting, propulsion and steering devices of the drive buggy, all other parts being omitted;

Fig. 15 is a diagrammatic view presented to show the conveyor belt and cable reeves;

Fig. 16 is an enlarged, fragmentary, vertical transverse section on the planes of the line 16—16 of Fig. 2 showing the pivotal connection between the conveying means and the truck portion of the drive buggy;

Fig. 17 is a fragmentary plan view, on an enlarged scale as compared with Fig. 3, showing parts in position for the addition of a roll of conveyor belting to the belting already in the apparatus;

Fig. 20 is a plan view of another drive buggy;

Fig. 21 is a side elevation of the drive buggy shown in Fig. 20;

Fig. 22 is an enlarged, transverse vertical section on the plane of the line 22—22 of Fig. 20, showing a front end elevation of the drive buggy;

Fig. 23 is an enlarged, longitudinal, vertical section on the plane of the line 23—23 of Fig. 20;

Fig. 24 is an enlarged plan view, with parts broken away, of another take-up buggy;

Fig. 25 is a side elevation of the take-up buggy of Fig. 24;

Fig. 26 is a longitudinal vertical section on the plane of the line 26—26 of Fig. 24;

Fig. 27 is a view, on a small scale, of a "Continuous Miner" and of the second illustrative embodiment of the present extensible portable conveyor in working cooperation relative with each other;

Fig. 28 is a diagrammatic view illustrating the conveyor belt and cable reeves of the drive buggy of Fig. 20;

Fig. 29 is a diagrammatic view, showing another hydraulic system—one adapted to the arrangements of the drive buggy of Fig. 20.

Figure 9:
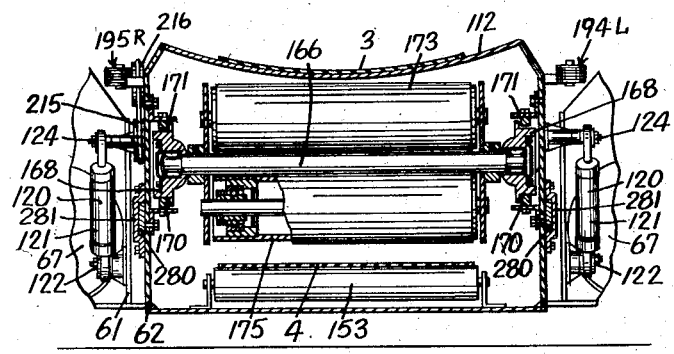
Fig. 9 is a transverse, vertical section on a further enlarged scale, on the planes of the lines 9—9 of Fig. 6, showing details of the construction of the movable belt cluster, and of frame tilt mechanism of the drive buggy.

The embodiment of the invention of Figs. 1–19 will first be described.

Referring to the drawings, and first to Figs. 1 and 2, and Figs. 3 and 4, it will be noted that a drive buggy 1 and a take-up buggy 2 are connected by the active, 3, and return, 4, runs of a conveyor belt generally designated 5. As the take-up buggy is much the simpler in construction it will be described first.

The take-up buggy 2 is shown in side elevation in Fig. 1, in plan in Fig. 3, and in central longitudinal section in Fig. 5. It comprises a body 12, supported by four wheels: two forward wheels 13 and 14 and two rearward wheels 15 and 16. The rearward wheels are independently power driven and are journaled on wheel mountings 17 secured to the body 12. Each rearward wheel has a drive sprocket 18 fixed to it, and the drive sprockets 18 are driven by motors 19 through usual reduction gearing in housings 20 and chain drives 21. The front wheels 13 and 14 are steerable, being journaled on steering knuckles 23 pivotally connected to a front axle 24 and being connected by a link 26 and arms 27 for turning together. A further arm 28, a reach rod 29 and a conventional manually operable means 30 for effecting pushing and pulling of the reach rod complete the steering mechanism. The axle 24 is pivotable about a horizontal axis extending longitudinally of the take-up buggy 2, as indicated at 31.

The body 12 rotatably supports a number of transverse idler rolls 33 adjacent its bottom, which is open centrally as indicated at 34. The rolls 33 guide the return run 4 of the belt 5 to a large idler roll 36, which is journaled in a yoke 37, which is mounted to swing horizontally about a pivot pin 38 extending, as shown, through ears 39 on the yoke and an intermediate bracket 40 secured to the body 12. The active run 3 of the conveyor belt is supported by relatively closely spaced oblique side idler rolls 42 and central, horizontal idler rolls 43, the supporting brackets 44 for the rolls being supported on a herein sloping deck plate 46. The top of the body 12 is covered by an end shield plate 48 and side shelf plates 49 which cooperate to form a hopper like material receiving opening 50 overlying the belt run 3, and a sloping plate 51 is carried by an inbent portion 52 of the end shield plate 48 and extends into close adjacency to the belt 5 just above the roll 36. Sloping portions 53 of the side plates 49 overlie the side edges of the belt 5.

From the description of the take-up buggy it will be understood that it is adapted to follow closely after a "Continuous Miner" and to receive through the opening 50 and onto the active run 3 of the conveyor belt 5 the discharge from the "Miner," and, as the belt 5 is circulated or driven, it will convey the disintegrated material upon the active run 3 thereof rearwardly and, as will shortly appear, along and over the drive buggy and discharge it at a desired point. The pivotal mounting 37 of the roll 36 will enable the belt 5 to extend smoothly to the drive buggy even if the body 12 should become slightly out of line. The propulsion means described enable the take-up buggy 2 to move about as necessary and to maintain itself in discharge receiving relation to the "Continuous Miner," though, as above indicated, it might be connected to the latter by a suitable draw bar arrangement if desired. Were it desired to do so, suitable brakes might be associated with the wheels 15, 16.

The drive buggy 1 may now be described: It is a self-propelled vehicle too. It includes a transport vehicle portion 61, and a conveyor belt supporting portion 62, the latter pivotally supported upon the former at 63 and as shown in detail in Fig. 16 and hereinafter more fully described.

The transport vehicle portion 61 resembles in many particulars a shuttle car. It comprises steerable front wheels 64, 64, and steerable rear wheels 65, 65. The front wheels are driven through conventional transmission means 66, 66 by reversible electric motors 67, 67.

Referring more specifically to Figs. 13 and 14, the front wheels are journaled on swingable axle mountings 70, 70 pivoted on vertical axes at the opposite ends of a transverse axle 71 rigidly secured to the base frame 61' of the portion 61, and the swiveled axle mountings have arms 72 connected by a conventional tie rod 73 so that the front wheels shall swing together. The rear wheels 65, 65 are journaled on swingable axle portions 74 pivotally mounted to turn on vertical axes at the ends of a transverse axle 75, and arms 76 carried by these axle mountings are connected by a conventional tie rod 77 so that the rear wheels shall turn together. The rear axle is pivoted at 78 at longitudinally spaced points on the base frame so that it may rock about a longitudinal axis lying in the central longitudinal vertical plane of the base.

The front wheels are propelling wheels, and the transmission 66 includes conventional speed reducers 79 each having a terminal shaft 80 coupled by a universal joint 81 to a transmission shaft 82. The rear ends of the shafts 82 are coupled by universal joints 83 to longitudinal shafts 84 journaled within the axle mountings 70 with which they are associated. Each shaft 84 carries within the mounting a worm 85 which meshes with a worm wheel 86 fixed to the axle to which the adjacent front wheel is secured. By this arrangement the front wheels may be driven by the motors 67 irrespective of the angles to which the wheels may be turned. Conventional front wheel brakes B, desirably of the hydraulically operated spot-disc type are associated with certain elements of the speed reducers 79, and conventional hydraulically operated brakes (not shown) are associated with the rear wheels for breaking them, and a common control is provided for all of these brakes. This structure being wholly conventional is not illustrated, as its details may vary widely without affecting the invention.

Four-wheel steering is provided, and the swivel mountings 70 and 74 of the wheels at one side of the base have arms 87 and 88 connected by drag links 89 and 90 respectively to one end of levers 91 and 92 pivotally mounted on transverse axes at the adjacent side of the base frame. The front lever 91 is pivotally connected near the pivotal connection of the latter with its associated drag link 89 to a link 93 which is in turn pivotally connected to the lower end of the rear lever 92. A fluid cylinder 94 pivoted at 95 on a bracket secured to the adjacent side of the base frame contains a reciprocable piston 96 having its piston rod 97 pivotally connected to the upper end of the front lever 91, with its pivot alined with the pivotal connection of the link 93 with this same lever. Thus, when fluid is suitably supplied to the cylinder 94, the piston 96 may be moved to effect opposite swinging movements of the front and rear wheels in one direction or the other to turn the machine through a sharply curved path. To effect steering, a steering wheel 99, located at the operator's station S at the rear end of the machine, is connected through a gear and gear segment to a steering arm 100 pivoted at 101 on the adjacent side of the base frame and connected by a pivoted rod 102 to the lower end of a lever 103. A drag link 104 connects the upper end of the lever 103 with the rear drag link 90. A link 105 pivotally connects the lever 103 with a stem 106 of a conventional control valve 107, commonly known as a Bendix, which controls the flow of liquid under pressure to the opposite ends of the cylinder 94. Thus, by turning the steering wheel 99, liquid under pressure may be supplied to the steering cylinder 94 to effect turning of the four steering wheels in the desired directions, and the drag link 104 provides a mechanical connection between the steering wheel 99 and the steering gear, whereby under certain conditions the wheels may be manually turned to effect steering. By trapping liquid in the steering cylinder 94, the wheels may be held in the desired position of adjustment in an obvious manner.

As shown in Fig. 16 the conveyor belt supporting portion 62 of the drive buggy 1 comprises side plates 111, 111 connected by a troughed plate portion 112 which serves as a guide and support for the active run 3 of the conveyor belt 5. A tubular element 113 extends between the plates 111, 111 and surrounds and is journaled on a transverse rod 115 whose opposite ends are supported in bushings 116 supported by the vehicle portion 61. Suitable devices, as for example cotter pins 117, hold the rod 115 against longitudinal displacement; and collars 118 keep the belt supporting portion 62 in proper space relation to the vehicle portion 61.

The angular relation of the portion 62 of the drive buggy 1 to the portion 61 thereof is varied, of course, by pivotal movement of the portion 62 on the pivotal connection 63. This pivotal movement is effected and controlled by hydraulic jacks 120, 120 of the cylinder and piston type, the cylinders 121 of these jacks being pivotally connected as at 122 to the lower forward part of the vehicle portion 61, and the piston rods of the jacks 120 being pivotally connected to pivot pins 124 fixed to the sides of the portion 62 (see Figs. 2 and 9).

The jacks 120 are single acting and the admission of fluid to their lower ends raises the forward end of the portion 62, whereas the weight distribution of such portion relative to the pivot 63 normally causes the forward end of such portion to tend to rest upon the mine bottom and, during material conveying operation, the jacks 120 may be vented in such manner that the forward end of the portion 62 will in fact rest upon the mine bottom.

The conveyor belt supporting portion 62 supports conveyor belt driving means and conveyor belt storing and tension maintaining means.

Now considering the conveyor belt driving means, it will be noted that a suitable electric motor 130 is supported upon a platform 131 carried by the main body or vehicle portion 61 of the drive buggy 1. This motor, through suitable reduction gearing 132 and an extensible and contractable universal transmission shaft arrangement 133 drives a shaft 134, Figs. 4 and 11, suitably journaled as at 135, 136 in a forwardly extending tubular portion 137 of a gear housing 138 secured to one of the sides of the portion 61. The gear housing 138 supports in suitable bearings 139, 140 a drive shaft 141 for a belt driving roll 142, which is driven from the shaft 134 by a bevel pinion 143' on the latter and a coacting, driven bevel gear 143'' fixed to the shaft 141. The other end of the shaft 141 is suitably journaled as at 144 in a bearing carried by the other side of the portion 62.

The belt driving roll 142 has associated with it a secondary drive roll or pulley 145. These rolls are suitably connected by spur gears 142', 145', Fig. 2. After passing downwardly over the drive roll 142 and up over the secondary drive roll 145, the belt 5 passes down and around and beneath a further roll 146 and then upward to the first roll 147 of a belt storage and paying out system generally designated 148. From the final roll 149 of the system 148 the return run 4 of the belt 5 passes forwardly over supporting idler rolls 151, 152, 153 and 154 and off from the drive buggy 1 to the take-up buggy 2, and over the rolls 33 on the latter. The several rolls so far described on the drive buggy are all journaled on the tiltable frame portion 62 thereof and, except for the supporting idlers 151, 152, 153 and 154 are rather close to the rear end of the same. A hold down roll 155 is rotatably carried by the frame 62 near its forward end.

The belt storage and paying out system 148 includes a series of rolls rotating on stationary axes, a series of rolls, called a cluster for convenience, mounted on a moving carriage, and means for controlling—and for also effecting at will—movement of the carriage and cluster relative to the rolls which turn on stationary axes. Two of the stationary rolls have already been mentioned. These are roll 147, near the lower side of the troughed plate 112 and the roll 149, near the bottom of the frame portion 62. There are two other rolls 161 and 162 journaled on the frame portion 62 and arranged the first above the second and both above the roll 149.

Figure 10:
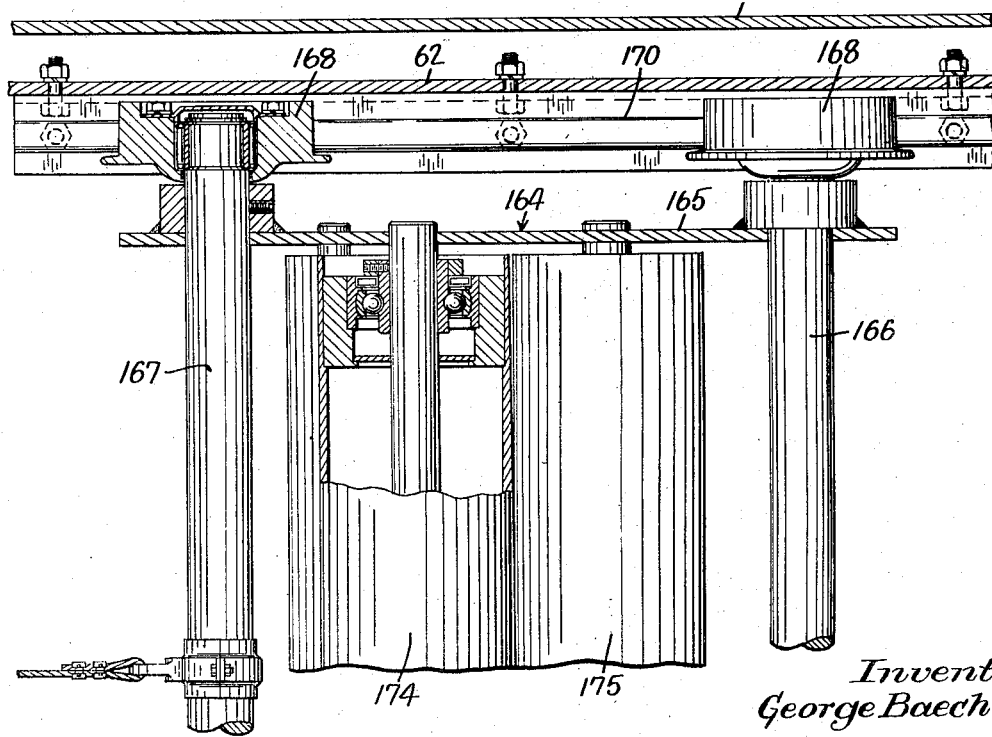
Fig. 10 is a fragmentary, nearly horizontal section, on a further enlarged scale, on the plane of the line 10—10 of Fig. 8, showing further details of the construction of the movable belt cluster.
Figure 18:
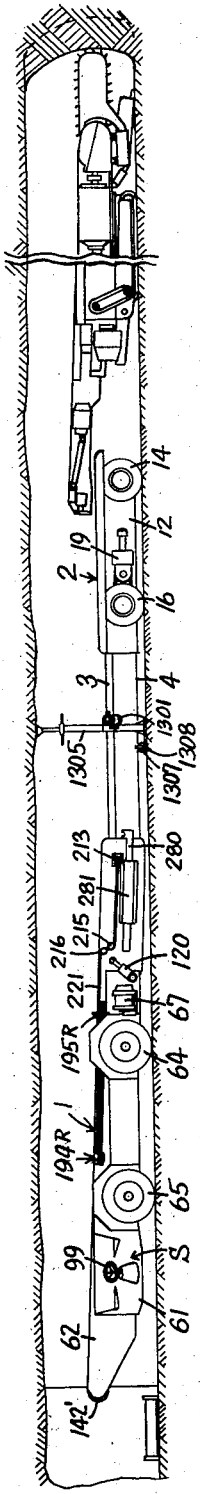
Fig. 18 is a view, on a small scale, of a "Continuous Miner" and of the first illustrative embodiment of the present extensible portable conveyor in working or cooperative relation with each other.

The moving carriage is designated 164, and, as may be seen from Figs. 8, 9 and 10, it includes a frame 165 having axles 166 and 167, and these axles have flanged wheels 168 suitably journaled on them. The flanged wheels 168 are guided by and roll along spaced pairs of rails on the frame portion 62—lower rails 170 and upper rails 171. The carriage 164 carries journaled on it five rolls: three belt reversing rolls 173, 174 and 175 and two belt guiding rolls 176 and 177. The rolls 173 and 175 are top and bottom rolls, one above the other, and the roll 174 is an intermediate roll and is rearward of the other two belt reversing rolls mentioned. The guiding rolls 176 and 177 are to the rear of and respectively above and below the horizontal plane which includes the axis of the roll 174.

Now it may be observed that, in addition to the active run 3 and the return run 4 of the belt 5, there are six strands or reaches of belt which have their lengths altered as there occurs relative movement of the carriage 164 between the guide rails 170, 171. These strands may be identified as follows:

181 between rolls 147 and 173,
182 between rolls 173 and 161 and coacting with roll 176,
183 between rolls 161 and 174,
184 between rolls 174 and 162,
185 between rolls 162 and 175, and coacting with roll 177, and
186 between rolls 175 and 149.

When the carriage 164 moves from the position shown in Fig. 8 to the position shown in Fig. 6 substantially six times as much belt length as the distance of carriage movement must be drawn into the system 148, and as such length may be supplied equally by the active and return runs, 3 and 4 respectively, of the belt, the take-up buggy 2, starting from a position at least as far from the drive buggy as three times the length of travel of the carriage 164 would have to move three times such distance towards the drive buggy 1 for the carriage to be able to make the movement mentioned. On the other hand, the take-up buggy could move away from the drive buggy three times as far as the carriage 164 would travel, if the carriage moved from the position of Fig. 6 to the position of Fig. 8.

Now, the carriage 164 can be moved from the position of Fig. 6 to the position of Fig. 8 by motion of the take-up buggy 2 away from the drive buggy 1, but new approach of the take-up buggy to the drive buggy would not wind in the slack produced without other arrangements than have been so far described. Moreover, there would be nothing to provide and maintain the necessary belt tautness in anything except a position in which the carriage 164 could move no further to the left in the positions of the apparatus shown in the longitudinal views thereof.

Accordingly there is provided means for resisting movements of the carriage 164 to the left in Figs. 4 and 6, i.e. outward or rearward movement thereof, for causing movements of the carriage 164 to the right simultaneously, with outward or rearward movement of the take-up buggy 2, for permitting deliberate movement of the carriage 164 from the position of Fig. 8 to that of Fig. 6 to be effected at will, and for maintaining automatically sufficient belt tension to permit conveying of the material to be handled. The apparatus provided for these purposes includes what may be called a hydraulically operable block and tackle arrangement associated with the carriage 164 for controlling and, alternatively, for effecting its movements.

These arrangements are best shown in Figs. 2, 4, 6, 7, 8 and 15. The frame portion 62 at each side thereof has secured thereto, near the top thereof and about midway between its ends, a double hydraulic cylinder and piston mechanism 190. The one of these mechanisms at the left of the apparatus, looking forward, is designated 190 L, the other 190 R. They extend longitudinally of the apparatus, and are single acting, and act in mutually opposite directions. Each includes a cylinder 191, a piston 192, a piston rod 193, a multiple (triple) block 194 on the outer end of its piston rod 193, and a multiple (double) block 195 on its cylinder head 196 not traversed by its piston rod. Each has a fluid supply and venting connection 197. All of the parts of the mechanisms 190 L and 190 R are distinguished by the letters L and R also. These mechanisms each have a cable section associated with them. A cable 200 is associated with the mechanism 190 L, a cable 201 with the mechanism 190 R. Each cable is attached at which may be called its free end to one end of the carriage 164. Cable 200 is attached to the outer or rearward end of carriage 164 as indicated at 205, passes rearwardly around a pulley 206 rotatably supported below the rolls 147 and 161 on the frame 62, passes to the left hand side of the frame 62 and around another pulley 207 mounted on the frame 62, and then, after passing over a pair of level-changing pulleys 208' and 208'' on the left side of frame 62, passes forwardly to and around the mechanism 190 L, and finally has its other end secured in fixed relation to the frame 62 at the point 209. Correspondingly, the cable portion 201 is connected to the carriage 164 at 210, extends forwardly and around a pulley 211 journaled on a cross element 212 of the frame 62 and located at the forward end of the latter, passes laterally to another pulley 213 rotatably supported for turning on a vertical axis at the right hand side of the frame 62, looking forward, and then passes rearwardly and around a pair of level-changing pulleys 215 and 216 journaled on horizontal axes on the right side of the frame 62, thus bringing it up to the level of the mechanism 190 R. From the pulley 216 the cable 201 is passed in cooperative relation with the mechanism 190 R and then has its remaining end fixed with respect to the right hand side of the frame 62 at 218.

The coaction of the cables 200 and 201 with the mechanisms 190 L and 190 R are just the reverse of each other, with the result that the extension of either mechanism will be attended by collapse (telescoping) of the other. Each of the blocks 194 has three pulleys, and the blocks 195 have two pulleys apiece on them. These pulleys will be identified, in the cases of the upper ones, by single primes; in the cases of the middle ones on blocks 194 and the lower ones on blocks 195 by double primes, and the lowest pulleys on blocks 194 will be identified by triple primes. Each will also be designated with an R or L for distinction between the two mechanisms. The arrangements of cable 201 with respect to mechanism 190 R will be now described further. The run of the cable passing rearwardly from the pulley 216 may be identified as 221. It passes, towards the center of the buggy 1, rearwardly, and around the pulley 194' R and continues in a forwardly extending run 222 and around the pulley 195' R. It then extends rearwardly again, in a run 223, and around the pulley 194'' R and then again forwardly in a run 224 to the pulley 195'' R and around the latter and once more rearwardly in a run 225 to the pulley 194''' R, and finally forwardly in a run 226 to the point of attachment 218 to the frame 62. The reeve of the cable 200 relative to the apparatus 190 L extends forwardly in a run 231 from the pulley 208'' to the pulley 194' L, backwardly in a run 232 to the pulley 195' L, forwardly in a run 233 to the pulley 194'' L, rearwardly in a run 234 to the pulley 195'' L, forwardly in a run 235 to the pulley 194''' L, and rearwardly in a run 236 to the point of attachment 209.

Figure 19:
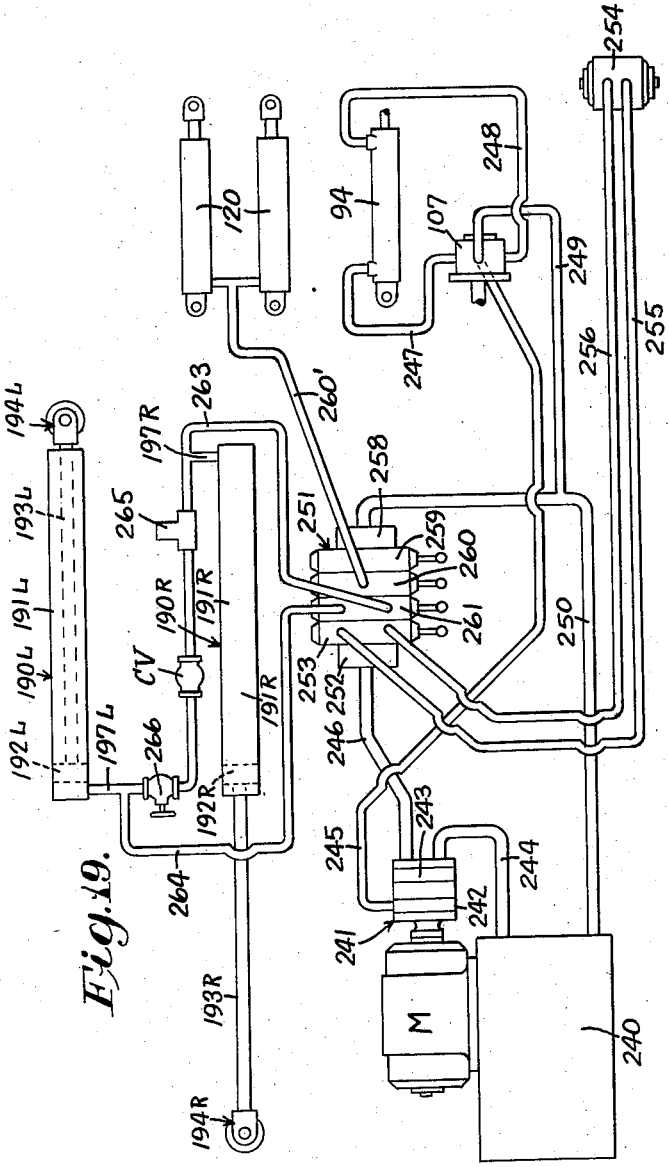
Fig. 19 is a diagrammatic view showing a hydraulic system.

The hydraulic system shown diagrammatically in Fig. 19 may advantageously be noted next. A fluid reservoir is shown at 240. A double pump 241, including a pump 242 for fluid to effect steering and a pump 243 for fluid for other functions, is driven by a motor, designated M, and which may, if desired, be the motor 130. The pumps 242 and 243 have a common suction line 244 and separate discharge lines 245 and 246 respectively. The line 245 leads to the Bendix control valve 107. Lines or conduits 247 and 248 lead from the Bendix to the opposite ends of the cylinder 94. A return line or exhaust conduit 249 extends from the Bendix back to a drain line 250 leading to the tank or reservoir 240.

Pump 243 discharges through the pressure supply conduit 246 to a valve box assembly 251, which includes a conventional end box 252 and a double acting valve 253 controlling the supply and venting of fluid with respect to a motor 254 for driving in winding or in unwinding direction a roll of conveyor belt as will later be described, conduits 255 and 256 connecting the valve 253 with the motor 254. The valve box assembly 251 includes another end box 258 connected with the vent line 250, and, next to the box 258 a control valve 259 which does not need to be described in detail as its functioning does not affect the present invention. Next to the left of valve 259 is a control valve 260 for supplying and venting through conduit means 260' fluid relative to the tilt jacks 120. Between the valve 253 and the valve 260 is another double acting control valve 261 which is movable oppositely to control the connections with the conduits 246 and 250 of conduits 263 and 264 which lead respectively to the conduits 197 R and 197 L. Between the connections 197 R and 197 L there are provided valve devices 265 and 266, the latter being a spring opened, but manually closable valve device, and the former a so-called pilot type relief valve allowing hydraulic fluid to pass, when its pressure is great enough, from conduit 263 to conduit 264. A check valve CV, opening from conduit 263 towards conduit 264 is provided between the valve devices 265 and 266.

Now, from what has been explained above, it will be understood that as the take-up buggy moves forwardly relative to the drive buggy, belt must be made available between the buggies, and this can be done only by causing the carriage 164 to move towards the outer (rearward) end of the drive buggy. This will mean a collapse, so to speak, of the mechanism 190 R, as the free length of the cable 201 must be increased for the carriage 164 to move rearwardly in its guideways. Now, the collapse of the mechanism 190 R must be resisted in order that adequate belt tension may be maintained, but yieldingly resisted, so that the take-up buggy can advance relative to the drive buggy.

This resistance, in the illustrative embodiment of the invention shown, is provided by the pilot type relief valve, with the double acting valve 261 in its mid-position, in which it blanks off the connections 263 and 264 both from supply and from the exhaust line.

As the piston 192 R is moved to the right in cylinder 191 R it will displace fluid past the relief valve 265, the check valve CV and the valve device 266. The setting of the relief valve will be such as to maintain the necessary tension on the active run of the belt during the loading operation when the take-up buggy 2 is standing still, plus an additional amount representing the desired resistance to movement of the take-up buggy forwardly. The take-up buggy will be moved ahead periodically as each new section of material is disintegrated for the full width of the face and a new section is to be attacked.

When the successive advances of the take-up buggy have resulted in an approach of the carriage 164 to the stationary rolls 161, 162 and 149, and no further quantity of belt can be paid off by means of further outward movement of the movable belt cluster, an additional roll of belt can be brought into the system as follows: At its forward end the drive buggy may be provided with slidable supporting arms for a roll of belt. These are illustrated in Fig. 17 at 280. They are slidable in guides 281 fixed to the side frames of the portion 62 of the drive buggy 1. They are recessed as at 282 to receive and support reduced portions 283 on a shaft 284, which is adapted to extend through and support a roll of belting 285. The shaft 284 is provided with a mounting for a gear 286, which may be driven by a pinion 287 supported on and driven by the belt roll driving motor 254 previously described. A roll of belting may be placed on a short section of frame 288 having guide rolls 289 pivotally supported on it. When the connection between the ends of the belt has been broken in the return run 4 of the belt 5 at a point between the drive buggy and the take-up buggy (note that the take-up buggy will ordinarily, when belt is to be inserted, be a considerable distance away from the inner end of the drive buggy) the roll of belt 285 may be slid on the guide rolls 289 into the same set of vertical planes with the belt 5, the sliding arms 280 may be slid underneath the shaft 284, the forward end of the drive buggy being lowered, if necessary, to make this possible. The forward end of the drive buggy may then be raised hydraulically as above explained, and the belt roll lifted out of contact with the rolls 289 on the frame 288. A gear drive between the motor 254 and the shaft 284 may then be arranged, as above explained, and the end of the belt in the roll can be connected to the portion of the return run of the belt which passes outwardly and around the stationary roll 149. Then by admitting fluid to the cylinder and piston mechanism 190 R the carriage 164 supporting the movable belt cluster may be moved from the position shown in Fig. 8 inwardly to the position indicated in Fig. 3, and, if the quantity of belt on the roll has been properly proportioned to the construction of the apparatus the whole roll of belt can be drawn on to the drive buggy. The central or innermost end of the belt from the roll may then be connected to the forwardly extending portion of the return run of the belt, and the apparatus will then be ready to function again to provide for further successive advances of the take-up buggy 2, these being accompanied, as noted, by traction exerted on the runs 3 and 4 of the belt 5, with resultant forcing of fluid from the cylinder and piston mechanism 190 R as the carriage 164 is progressively moved toward the outer end of the drive buggy. Forward movement of the carriage 164 during the addition of belt causes belt to be drawn in in the return run only, rather than also in the "active run," because the belt drive arrangements prevent the run 181 from pulling the run 3 outwardly. After the mining operation has been carried as far as desired, by successive extensions, through the addition of new lengths of belt to the extensible portable belt conveyor, it will be evident that belt can be removed from the system by disconnecting the belt and winding sections of it onto successive shafts 284, removing successive rolls of belt as they are wound up. It will be appreciated that the take-up buggy 2 will be progressively backed out at the appropriate speed as the belt to be removed is wound in rolls.

The active run 3 of the belt 5 will be supported, as the distance between the take-up buggy and the drive buggy increases, by prop-supported idler rollers which may be formed of roller elements 1301 rotatable on an upwardly concave shaft section 1302 and separated by wedgelike separator elements 1303, the shaft 1302 being pivotally supported as at 1304 as by jack pipes 1305 and the belt run 3 being guided by the rolls. The forwardly moving run of the belt 4 may be supported on rollers 1307 journaled on frames 1308 which can simply be supported on the mine floor underneath the return run of the belt. The source of power may be a suitable plug and socket connector on a "continuous Miner," but it will be understood that other power supply arrangements can be employed, if desired.

To cause belt to be drawn into the system, it is necessary to effect movement of the piston 192 R to the left. This is accomplished by shifting the valve 261 to supply pressure to conduit 263, and it will be noted that conduit 264 will then be connected to the tank 240 so that fluid may be displaced from cylinder 191 L.

When it is desired to shorten the belt length in use, the piston 192 R will be supplied with fluid, and the wheel drive of the take-up buggy may be operated to cause the latter to move towards the drive buggy at the proper rate, if desired, as will normally be the case.

Whenever the valve 261 is used to supply fluid from the line 246 to the cylinder 191 R, the valve 266 will be closed, thus making a higher pressure available—the pressure determined by the usual relief valve in box 252.

If fluid is supplied to piston 192 L with the belt cluster at the extreme right end of Fig. 6, the cluster will be moved to the left and belt can be drawn out without resistance. This would be useful if there were to be desired a removal of belt at a point just short of the drive roll. It will be noted that if fluid is supplied to conduit 264 valve 266 will be manually closed.

When belt is to be removed, it will ordinarily be done at the front of the drive buggy, a shaft 284 being driven to wind in one run of the belt 5. The return run can be wound up while the tension on the active run is maintained by retarding the rate of outward movement of the take-up buggy, and disconnecting only the return run. If both portions 3 and 4 are disconnected, as might be the case when the apparatus is being prepared for movement to a new point, either run could be wound up in a roll, as desired.

From the foregoing description it will be apparent that the portable extensible belt conveyor apparatus of this embodiment is adapted to permit the use of an extensible conveyor system requiring a minimum number of interruptions for the introduction of additional belt, and that rooms and entries of considerable length can be effectively handled from the material removal standpoint with the apparatus mentioned.

The multiple belt reeve in connection with the mechanism 148 enables the handling of relatively long lengths of belt with a drive buggy of reasonable length, and the multiple cable reeves enable the high effective use of hydraulic pressures. With belt introduced into the system wholly on the return run 4, six feet of belt will be drawn in for each foot of movement of the carriage 164 to the right in Fig. 8. Each foot of movement of the carriage will require only .2′ (one-fifth of a foot) of movement of the piston 192 L to accomplish it, but this movement of the carriage will require relatively little power. On the other hand, when the take-up buggy is advancing one foot, the carriage 164 will be moved but ⅓ foot, and the piston 192 R will be moved but ¹⁄₁₅ foot.

In Figs. 20 to 29, another embodiment of the invention is disclosed. This includes a drive buggy 301 and a take-up buggy 302 connected by an active run 303, and a return run 304, of a conveyor belt generally designated 305. In the case of this embodiment also, the take-up buggy will be described first.

The take-up buggy 302 is shown in side elevation in Fig. 25, in plan in Fig. 24, and in central longitudinal section in Fig. 26. It comprises a body 312 supported by tractor mountings 313 and 314 at its opposite sides, these tractor mountings being connected by T-shaped (in cross section) supports 315 with the side plates 316 of the body 312. The tractor mountings include frames 317 about which endless tread devices 318 travel; and these endless tread devices are provided with suitable drives 319 at their rearward ends, to each of which, in a well known manner, power is supplied by a chain and sprocket drive connection 320 from a motor 321 mounted on a side plate of the take-up buggy. Obviously by approriately controlling the motors 321, the take-up buggy may be advanced, retracted, and turned in any desired manner, as well as be held stationary.

The body 312 rotatably supports a number of transversely disposed idler rolls 333 adjacent its bottom, which is open centrally as indicated at 334. The rolls 333 guide the return run 304 of the belt 305 to a large idler roll 336, supported on a shaft 337 which may be carried and journaled in any suitable manner by the body 312. Herein it is shown rotatably supported by bearing boxes 338 mounted on the side plates 316. The side plates 316 each have a longitudinal flange 339 secured to them for a purpose soon to be noted. The active run 303 of the conveyor belt 305 is supported by relatively closely spaced oblique series of side idler rolls 342 and central horizontal idler roll series 343. The individual idler roll elements may desirably be of rubber or the like. The supporting brackets 344 for the rolls 342 and the supporting brackets 345 for the rolls 343 are supported on plate elements 346 which extend between the side plates 316 of the body 312 and are supported on the flanges 339. The side plates of the body 312 are connected by transverse tubular brace elements 347. The top of the body 312 is partially covered by an end shield plate 348 and side shield plates 349 which cooperate to form a hopper-like receiving opening 350 overlying the belt run 303 adjacent its forward end. The shield plates slope inwardly and are equipped with adjustable extension which are identified by the same numerals as the shield plates proper, but with primes added. It will be observed that the belt portion 303 is shrouded laterally and at its forward end by the shield plates. While there are substantial differences in the construction of the take-up buggy 302 from that of the take-up buggy 2, it will be appreciated that the buggy 302 is adapted to perform the same functions as buggy 2, which functions have been adequately described at an earlier point in this specification.

The drive buggy 301 may now be noted. It too is a self-propelled vehicle. It includes a transport vehicle portion 361 and a conveyor belt supporting portion 362, the latter pivotally supported on the former at 363, for tilting about a transverse axis.

The transport vehicle portion 361 includes elongated upright side frames 365 connected with each other by cross elements 366 and each connected to a boxlike frame 367 about which a flexible tractor tread device 368 is guided. Each tractor tread device 368 is driven by a motor 369 individual to it, through suitable transmission mechanism 370 driving a drive sprocket 371 for the flexible tractor tread device 368 which it actuates. The conveyor belt supporting portion 362 consists of opposite side plate elements 373, 373 suitably held in spaced relation with respect to each other. They are connected at their tops by a troughed plate portion 375 which serves as a guide and support for the active run 303 of the conveyor belt 305. Transverse reinforcing members 375′ underlie the troughed plate portion at appropriate points. Bearing rings 376 welded to the plates 373 surround and are journaled on a transverse rod 377 whose opposite ends are supported in bearing rings 378 supported on the side plates of the vehicle portion 361. Suitable means, as, for example, cotter pins 379, hold the rod 377 against longitudinal displacement, and the engagements of the bearing rings 376 and 378 keep the belt supporting portion 362 in proper lateral space relation to the vehicle portion 361. It will be evident that by the proper control of the motors 369, the drive buggy 1 may be advanced, retracted and turned in any desired manner.

The angular relation of the portion 362 of the drive buggy 301 to the portion 361 thereof is varied by pivotal movement of the portion 362 on the pivotal connection 363. This pivotal movement is effected and controlled by hydraulic jacks 390, 390 of the cylinder and piston type, the cylinder 391 of these jacks being pivotally connected as at 392 to the vehicle portion 361 at the right hand end of the latter, as shown in Fig. 21, and the piston rods 393 of the jacks 390 being pivotally connected to pivot pins 394 fixed to the sides of the portion 362. (See Figs. 21 and 22.) The jacks 390 are single-acting, and the admission of fluid to their lower ends raises the forward end of the portion 362, whereas the weight disposition of this portion relative to the pivot 363 will cause the forward end of such portion to swing downwardly upon venting of fluid from the jacks 390. The conveyor belt supporting portion 362 supports conveyor belt driving means and conveyor belt storing and tension maintaining means.

Considering first the conveyor belt driving means, it will be noted that a suitable electric motor 400 is supported upon a platform 401 carried by the main body or vehicle portion 361 of the drive buggy 301. This motor, through suitable reduction gearing (not shown) and a universal transmission shaft arrangement 403, drives a shaft 404 which drives through appropriate direction changing gearing enclosed in a housing 405, a transverse drive shaft 406 supporting a belt driving roll 407. The belt driving roll 407 has associated with it a secondary drive roll 408. These rolls are suitably connected by spur gears 407' and 408'. After passing downwardly over the drive roll 407 and up over the secondary drive roll 408, the belt 305 passes down and around and beneath a further roll 409 and then upwardly to the first roll 410 of a belt storage and paying out system, generally designated 411. From the final roll 412 of the system 411 the return run 304 of the belt 305 passes forwardly to over supporting idler rolls to the tape-up buggy. The several rolls so far described as being located on the drive buggy, are all journaled on the tiltable frame portion 362 thereof. The belt storage and paying out system 411 includes a series of rolls rotating on stationary axes, a series of rolls, called a cluster for convenience, mounted on a moving carriage, and means for controlling the movement of the carriage and its supported cluster relative to the rolls which turn on stationary axes. Two of the series of rolls forming the belt storage and paying out system have already been mentioned. These are roll 410 near the lower side of the trough plate 375, and the roll 412 near the bottom of the frame portion 362. There are four other rolls in this system which are mounted to turn on stationary axes. Two of these, 415 and 416, are journaled on the frame portion 362 and arranged the first above the second; and between and with its axis to the rear of the plane which includes the axis of rotation of the rolls 415 and 416 there is a still further roll 417. The fourth of these rolls, numbered 418, is disposed just forward of the roll 410. In addition to the drive rolls 407 and 408 there are rolls 409, 410, 418, 415, 417, 416 and 412 which rotate on axes fixed relative to the frame 362.

The "cluster" above referred to is generally designated 423 and it has a movable carriage 424, and, as may be seen from Fig. 23, it includes a frame 425 having axles 426 and 427, and these axles have flanged wheels 428 suitably supported on them. The flanged wheels 428 are guided by and roll along spaced pairs of rails on the frame portion 362, lower rails 430 and upper rails 431. The carriage 424 carries journaled on it five rolls, three belt reversing rolls 433, 434 and 435, and two belt guiding rolls 436 and 437. The rolls 433 and 435 are top and bottom rolls, one above the other, and the roll 434 is an intermediate roll and is rearward of the other two belt reversing rolls mentioned. The guiding rolls 436 and 437 are to the rear of and respectively above and below the horizontal plane which includes the axis of the roll 434.

Now it will be noted that in addition to the active run 303 and the return run 304 of the belt 305, there are six strands or reaches of belt which have their lengths altered as there occurs relative movement of the carriage 424 between the guide rails 430, 431. These strands may be identified as follows:

441 between rolls 410 and 433,
442 between rolls 433 and 418 and coacting with roll 436,
443 between rolls 418 and 434 and coacting with roll 415,
444 between rolls 434 and 417,
445 between rolls 417 and 435 and coacting with roll 437, and
446 between rolls 435 and 412 and coacting with roll 416.

When the carriage 424 moves from the position shown in Fig. 23, toward the right in that figure, substantially six times as much belt length as the distance of carriage movement must be drawn into the system 411, and as such length may be supplied equally by the active and return runs 303 and 304, respectively, of the belt, the take-up buggy 302, starting from a position at least as far from the drive buggy as three times the length of travel of the carriage 424, would have to move three times such distance toward the drive buggy 301 for the carriage to be able to make the movement mentioned. On the other hand, the take-up buggy can move away from the drive buggy three times as far as the carriage 424 travels if the carriage moves from a position to the right of that shown in Fig. 23, to the position shown in that figure.

The carriage 424 can be caused to move to the left upon the drive buggy by motion of the take-up buggy away from the drive buggy, but a return of the take-up buggy towards the drive buggy will not effect the winding in of the slack thereby produced. Accordingly, means must be provided to wind in such slack, and to permit the introduction of additional belting into the system, and to maintain necessary tension in the belt system. According to this embodiment of the invention, a simpler control system for movement of the carriage 424 is provided than is the case with the first embodiment, and these arrangements are illustrated in Figs. 28 and 29. The frame portion 362 at one side thereof, herein the left hand side looking forwardly, has secured to it near its top and forwardly of its longitudinal center, a hydraulic cylinder and piston mechanism 450. This is a single-acting hydraulic cylinder and piston mechanism, and it includes a cylinder 451, a piston 452, a piston rod 453, a multiple (triple) block 454, diagrammatically shown in Fig. 28 and carried on the piston rod 453, and a multiple (double) block 455 mounted on the head 456 of the cylinder 451. The block 455 is visible in side elevation in Fig. 22, and both of the blocks are visible in plan in Fig. 20. The mechanism 450 has a cable section 460 associated with it. One end of this cable is attached at what may be called its free end to the forward end of the carriage 424, as at 461. From the connection 461 the cable 460 extends forwardly and around a pulley 462 journaled on an oblique element 463 carried by the frame 362, and located at the forward end of the latter. It then passes laterally to another pulley 464, rotatably supported for turning on a vertical axis at the left hand side of the frame 362 looking forward, and then passes rearwardly and around a pair of pulleys 465 and 466 which, so to speak, set it over laterally of the frame 362 to a position outside of the latter. From the pulley 466, the cable 460 is passed in cooperative relation with the mechanism 450, and then has its remaining end fixed with respect to the cylinder 451. The multiple block 454 has its three sheaves individually identified by the reference characters 454', 454" and 454'''. The sheaves of the multiple block 455 are individually identified by the reference characters 455′ and 455″. The run of the cable passing rearwardly from the pulley 466 may be identified as 471. It passes rearwardly and around the pulley 454′ and then continues as a forwardly extending run 472 to and around the pulley 455′. From the pulley 455′ a run 473 extends rearwardly to and around the sheave 454″. After passing around the sheave 454″ the cable has a run 474 extending forward to the sheave 455″, and then there is a rearwardly extending run 475 passing to the sheave 454‴, and from the latter a terminal portion 476 extends forwardly and is connected in fixed relation to the cylinder 451.

Before noting the hydraulic system, the fact may be pointed out that a shaft 480 is journaled in the forward end of the frame 362 and is adapted to receive a reel and to be driven by a motor 482 through a chain and sprocket drive 483. The motor 482 may be of the hydraulic type and be provided with a control valve 484.

Fig. 29 shows a combined hydraulic and electric system which may be used for controlling the operation of the mechanism so far described with respect to the second illustrative embodiment. In Fig. 29, the cylinder 451 is shown and this, with its piston 452, will be referred to, for convenience, as the take-up jack. Fluid is adapted to be supplied to and released from the take-up jack through a conduit 490. A tank or reservoir 491 for a hydraulic fluid is provided. A pump 492 has its intake connected by a conduit 493 with the tank 491. Pump 492 is adapted to be driven by an electric motor 494, the control circuit for which will shortly be described. Motor 494 and pump 492 are supported on the transport vehicle portion 361, on the left hand side of the forward end thereof. Pump 492 has a discharge line 495 in which there is a check valve 496 which permits fluid to flow from the conduit 495, but which prevents reverse flow. The check valve 496 is connected by a conduit 497 with the supply section 498 of a valve box structure 499. This last includes the supply section 498, two control valve sections 501 and 502, and a discharge section 503. Any suitable form of valve sections 501 and 502 may be employed, and, as many varieties suited to the present purposes are available in the open market, it will suffice to state that the valve section 501 contains a valve element, not shown, but operable by a handle 505 to three conventional positions of "work," "neutral," and "discharge." This valve is adapted, when moved to its "work" position, to supply fluid to a conduit 506 having branches 507 and 508 leading to the lifting jacks 390. The valve section 502 contains a valve not shown, and operable by a handle 510 to conventional "work," "neutral," and "discharge" positions. It is operative in its "work" position to supply fluid to the take-up jack 450 through the conduit 490. In the midpositions of the valve elements associated with the valve boxes 501 and 502, fluid may flow freely from the conduit 497 through the several box elements and into a conduit 515 which connects to the control valve 484. This latter valve is connected by another conduit 516 with the winding motor 482, and exhaust from this motor is connected by a conduit 517 with a return conduit 513 opening into the tank 491. The valve box 484 is connected by conduit 500 with the conduit 512, and when the control valve 484 interrupts communication between the conduits 515 and 516, it opens a connection between the conduit 515 and the conduit 500, which connection is cut off when the valve 484 is supplying fluid to the driving motor 482. The conduit 490 has another conduit 522 connected with it at a point between the valve block 502 and the cylinder 451. Conduit 522 has in it a cut-off valve 524 movable to a position permitting flow between the conduit 490 and the conduit 513. In other words, if the cut-off valve 524 is open, fluid supplied to the conduit 490 may be vented to the conduit 513. A pressure relief valve or back pressure valve 526 is arranged in the conduit 522, and this is set to limit the pressure normally maintained in the take-up jack 450. The conduit 490 is connected with a pressure switch, diagrammatically shown at 530, and if the pressure in the conduit 490 falls, under circumstances later to be described, the pressure switch 530 will effect starting of the motor 494. It will be noted that power lines 531 and 532 are connected, the one with a conductor 533 containing a motor starting switch 534 and leading to the pump motor and the other (532) with a connection 535 leading also to the pump motor 494. The switch 534 has an operating solenoid 537 connected by a conductor 538 with the power line 532 and also adapted to be connected with the power line 531. Power line 531 has a selector switch 540 which is adapted to be moved selectively into contact with switch points 541 and 542. Switch point 542 is connected by conductor 543 with the end of the solenoid 537 which is not connected with the conductor 538. The pressure switch 530 has a switch element 545 which is adapted to establish and/or interrupt a circuit between the switch point 541 and the end of the solenoid 537 to which the conductor 543 leads, this through another conductor 546. It will be observed that the switch 545 will be closed only when the pressure in the line 490 is quite low. It will be further observed that with proper positioning of the switch element 540, the pump motor may be caused to drive the pump continuously. To do this the switch element 540 will contact the switch point 542.

It will be observed that the take-up jack will be under manual control when the switch element 540 is in engagement with the switch point 542, and under automatic control when the switch element 540 engages the switch point 541. Manual control of the take-up jack is desired: (1) when the belt is to be threaded initially into the drive section, (2) when the cluster carriage 424 is to be moved to effect the addition of belt to the system, and (3) when it is necessary to effect tensioning of the belt deliberately. This manual operation will be accomplished by employing the selector switch 540 to prevent the pressure responsive switch device 530 from functioning to control the pump motor, by holding the cut-off valve 524 in closed position, so that hydraulic fluid will not by-pass to the tank past the belt tension valve 526, and by moving the handle 510 to work position. Performance of these three operations will extend the take-up jack and draw the cluster away from the stationary belt idlers, and the machine will be filled with belt, or the belt will be tensioned, whichever may be the function which needs to be performed. Manual venting of the take-up jack 450 through conduit 490 to allow collapse of the take-up jack can be had by moving the valve handle 510 to its "discharge" position, which connects conduit 490 to tank 491 through conduit 512. The lifting jacks 390 can be vented by moving valve handle 505 to "discharge" and valve handle 510 to "neutral," so as to connect conduit 506 to conduit 512 and tank 491.

To arrange the controls for what may be termed normal operation, that is so that belt is paid out when extension of the conveyor length is needed and so that belt tension will be maintained if the take-up buggy is backed up for any reason, the following operations will be performed: the handle 510 will be moved to "work" position and held in this position in any suitable manner, as by a dog, diagrammatically illustrated at 550. The switch 540 will be moved into engagement with switch point 541, and control of the pump motor will be lodged in the pressure responsive device 530. With this setup, tension on the belt will maintain pressure in the take-up jack by trying to collapse it. The pump motor will not be driven if the pressure in the take-up jack is at or above what is normal operating pressure. The check valve will be closed at this time. Driving of the take-up buggy ahead will increase this tension, and the belt tension valve 526 will then be cracked sufficiently to let some oil flow out of the take-up jack and back to the tank. The cluster will thus be allowed to move in a direction to pay out the belt. When the normal operating tension is once more restored, the belt tension valve will close and the existing tension will be maintained until it is necessary to extend the length of the conveyor again.

Now if the take-up buggy is backed, belt tension will drop to a low value, and accordingly the pressure in the take-up jack will drop to a value low enough to permit switch element 545 to close a circuit through the solenoid 537, and close the motor control switch 534 and start the pump motor 494, which will operate to restore pressure to the take-up jack, and the cluster will be drawn forwardly until proper tension is reached or until the cluster reaches its forwardmost position, whichever occurs first. When the restored pressure in the take-up jack reaches the correct operating value, the pressure switch control device 530 will effect stopping of the pump motor, and the conveyor will again be in a position to pay out belt when the take-up buggy moves ahead. It will be appreciated that the device 530 may well be of a character having a rather wide range of pressure difference between the points at which the switch 545 is closed and reopened. Such devices are well known, and any suitable one may be employed. The device 530 is but diagrammatically illustrated in Fig. 29, it will be understood.

When the winding motor 482 is used to remove belt from the conveyor, or when the lift jacks 390 are used, the selector switch 540 will be moved to engage the switch point 542, causing the pump 492 to be driven and supply fluid under pressure as long as the switch 540 is in the position mentioned.

From the foregoing description it will be observed that the two buggies comprise conveyor belt driving means, a movable conveyor belt take-up device, and between the driving means and the take-up device is an extensible and collapsible belt take-up and storage apparatus, nearer, in the construction shown, to the belt driving means; that provision is made for effecting relative movement of translation between the belt driving means and the conveyor belt take-up device; that there is provision for steering the said driving means and said take-up device; that the driving means and take-up device have separate supporting means; that one of said separate supporting means has a material discharge and the other a hopper for receiving mineral; that there is disclosed a conveyor including a closed belt loop having a portion arranged to allow for extensibility, rolls engaging said belt including an idler roll at one end of said belt loop and a drive roll at the other end of said belt loop, said belt having a run extending between said idler and drive rolls, a carriage supporting at least one idler roll engaging a folded belt portion, and a stationary, rotatably supported idler roll near said drive roll to which a run of said belt extends from a carriage supported roll and from which a run of said belt extends to said first mentioned idler roll, a support for said first mentioned idler roll, a relatively translatorily movable support for said other rolls, and hydraulic apparatus in proximity with said drive roll and having a connection with said carriage and acting under pressure fluid supplied thereto to exert a pressure on said carriage tending to move said carriage away from said drive roll; that there is likewise disclosed an extensible belt conveyor comprising a support having a belt drive thereon, a separate support having a reversing idler thereon, at least one of said supports being movable translatorily relative to the other to vary their distance apart, an endless conveyor belt guided on and extending between said belt drive and said reversible idler, and means between said belt drive and reversing idler for drawing in and paying out a substantial portion of the belt whereby the belt drive and reversing idler may be disposed relatively close together or relatively more widely spaced while the guided relation of said belt with respect to said drive and said reversing idler is maintained, and, finally that there is disclosed a self-propelled head unit, a self-propelled rear unit trailing said head unit, an endless conveyor belt extending between and guided on said units, driving means carried by one of said units for driving said belt, and power operated take-up and storing means for said belt for take-up and storing of said belt whereby the latter may be extended to increase its length as said units are moved apart, and means embodied in said units for steering the same as said units are propelled.

This application is a continuation of my copending application Serial No. 225,791, filed May 11, 1951, which is a continuation-in-part of application Serial No. 149,787, filed March 15, 1950, and now abandoned.

While there are in this application specifically described two forms which the invention may assume in practice, it will be understood that these forms of the same are shown for purposes of illustration and that the invention may be modified and embodied in various other forms without departing from its spirit or the scope of the appended claims.

What I claim is:

1. A belt conveyor comprising, an endless conveyor belt having a variable length looped portion to allow for extensibility, generally horizontally extending guiding means, a carriage movable along said guiding means, at least one belt-guiding pulley mounted on said carriage, pressure fluid operable means operatively connected with said carriage for exerting a predetermined force on said carriage to move the same in a direction to increase the length of said looped portion of said belt, a source of fluid under pressure, conduit means for connecting said pressure fluid operable means with said source, a return line, and means for connecting said conduit means with said return line including a back pressure providing device for maintaining a predetermined resistance to flow from said conduit means to said return line.

2. In combination, in a material handling apparatus, a pair of relatively movable supports, one having a tail pulley thereon and the other having belt driving and storing means thereon, a normally endless belt having joined ends adapted to be parted which is supported on and extends between said supports, means carried by one of said supports for supporting a roll of belt, and means for drawing a section of said endless belt therefrom when said endless belt is parted and roll said section up.

3. In combination, in a material handling apparatus, a pair of self-propelled steerable vehicles, one having a tail pulley thereon and the other having belt driving and steering means thereon, a normally continuous, portable belt loop supported on and extending between said vehicles, means carried by one of said vehicles for supporting a roll of belt, and means for turning a roll of belt supported by said supporting means to effect a drawing of belt from said loop, when the latter is parted, and its rolling up on said roll.

4. In a belt conveyor, a closed belt loop having a portion to allow for extensibility, rolls engaging said belt including an idler roll at one end of said belt loop, a drive roll at the other end of said belt loop, a carriage supporting at least one idler roll engaging said portion of said belt loop, and a rotatably supported idler roll near said drive roll to which a run of said belt extends from a carriage supported roll and from which a run of said belt extends to said first mentioned idler roll, a support for said first mentioned idler roll, a separate support for said other rolls, a fluid operated device on said second support having a connection with said carriage and acting under pressure fluid supplied thereto to exert a pressure on said carriage tending to move said carriage away from said rotatably supported idler roll, means for supplying fluid under pressure to said fluid operated device and means responsive to the pressure in said fluid operated device to regulate the fluid supply to said fluid operated device.

5. In a belt conveyor, a closed belt loop having a portion to allow for extensibility, rolls engaging said belt including an idler roll at one end of said belt loop, a drive roll at the other end of said belt loop, a carriage supporting at least one idler roll engaging said portion of said belt loop, and a rotatably supported idler roll near said drive roll to which a run of said belt extends from a carriage supported roll and from which a run of said belt extends to said first mentioned idler roll, a support for said first mentioned idler roll, a separate support for said other rolls, a fluid operated device on said second support having a connection with said carriage and acting under pressure fluid supplied thereto to exert a pressure on said carriage tending to move said carriage away from said rotatably supported idler roll, means for supplying fluid under pressure to said fluid operated device means responsive to the pressure acting on said fluid operated device to regulate the fluid supply to said fluid operated device, and selective manual and pressure responsive controls for regulating said last mentioned means.

6. In a belt conveyor, a belt-driving and extension unit including, in combination, a mobile frame, a belt-driving unit adjacent one end of said frame, carriage guiding means extending along said frame, a carriage bodily movable along said guiding means and carrying a plurality of direction-reversing belt-guiding pulleys, a plurality of direction-reversing belt-guiding pulleys supported by said frame adjacent said belt-driving unit, means for yieldably exerting a pressure to move said carriage bodily away from said pulleys adjacent said belt-driving unit, a tail pulley, a support for said tail pulley distinct from said first mentioned frame and movable bodily towards and from the latter and said belt-driving and extension unit, means for effecting such bodily movement of said tail pulley, a belt extending from said tail pulley to said driving unit around said belt-guiding pulleys and back to said tail pulley in a continuous loop and constituting the sole connection with said tail pulley and its support for transmitting a force to effect movement of said carriage against the pressure aforesaid, and each of said belt-guiding pulleys being located with respect to all other of said belt-guiding pulleys with a portion of said endless conveyor belt reeved about said belt-guiding pulleys to provide the only connection between said belt-guiding pulleys and to effect take-up and paying-out of belt in lengths greater than twice the change in spacing between said pluralities of belt-guiding pulleys.

7. In a belt conveyor, in combination, a frame, carriage guiding means extending along said frame, a carriage bodily movable along said guiding means and carrying a plurality of direction-reversing belt-guiding pulleys, a plurality of direction-reversing belt-guiding pulleys on said frame towards and from which said carriage is movable, means for yieldably exerting a pressure to move said carriage away from said pulleys towards and from which said carriage is movable, a tail pulley supported on a frame separate from said first mentioned frame and movable bodily towards and from the latter, means for effecting such bodily movement of said tail pulley, a belt driving unit supported by one of said frames, a conveyor belt extending from said tail pulley to said driving unit around said belt guiding pulleys and back to said tail pulley in a continuous loop and constituting the sole connection with said tail pulley and its support for transmitting traction to effect movement of said carriage against the pressure aforesaid and each of said belt-guiding pulleys being located with respect to all other of said belt-guiding pulleys with a portion of said endless conveyor belt reeved about said belt-guiding pulleys to provide the only connection between said belt-guiding pulleys and to effect take-up and paying-out of belt in lengths greater than twice the change in spacing between said pluralities of belt-guiding pulleys.

8. In a belt conveyor, a belt-driving and extension unit including, in combination, a mobile frame, a belt-driving unit adjacent one end of said frame, guideways extending along said frame, a carriage movable along said guideways and carrying a plurality of belt-guiding pulleys, a plurality of belt-guiding pulleys adjacent said belt-driving unit, means for exerting a pressure to move said carriage away from said plurality of guiding pulleys adjacent said belt-driving unit, a tail pulley, a support for said tail pulley distinct from said first mentioned frame and movable bodily towards and from the latter and said belt-driving and extension unit, means for effecting such bodily movement, a belt extending from said tail pulley to said driving unit around said guiding pulleys and back to said tail pulley in a continuous loop, said belt constituting as said support is moved away from said first mentioned frame a sole tensioned connection extending between them for transmitting a force to overcome the pressure aforesaid and move said carriage in the opposite direction, and each of said belt-guiding pulleys being located with respect to all other of said belt-guiding pulleys with a portion of said endless conveyor belt reeved about said belt-guiding pulleys to provide the only connection between said belt-guiding pulleys and to effect take-up and paying-out of belt in lengths greater than twice the change in spacing between said pluralities of belt-guiding pulleys.

9. An extensible belt conveyor comprising, a pair of supports each having belt guiding and reversing means thereon, at least one of said supports being movable translationally relative to the other to vary their distance apart, an endless conveyor belt guided by and extending between said belt guiding and reversing means, means between said belt guiding and reversing means for drawing in, paying out and storing a substantial portion of the belt whereby the belt guiding and reversing means may be disposed with their respective supports relatively close together or relatively more widely spaced while the guided relation of said belt with respect to said guiding and reversing means is maintained, and means engageable with said conveyor belt for driving said conveyor belt in any aforesaid relative positions of said supports and whether said supports are relatively stationary or one is moving relative to the other.

10. A mobile extensible belt conveyor comprising, a pair of supports, one of said supports trailing the other, said supports being movable relative to each other to vary their distance apart, an endless conveyor belt guided on and extending between said supports, means on one of said supports for drawing in, paying out and storing a substantial portion of said belt whereby said supports may be disposed relatively close together or relatively more widely apart while the guided relation of said belt with respect to said supports is maintained, and means engageable with said conveyor belt for driving said belt in any aforesaid relative positions of said supports and operative during such relative movement of said supports.

11. A conveyor as set forth in claim 9 wherein means is provided on said other support for controlling the relative movement apart of said supports.

12. A conveyor as set forth in claim 9 wherein said means for drawing in, paying out and storing said substantial portion of said conveyor belt comprises power operated take-up means operable to take up any slack in the conveyor belt as said supports move toward one another and to pay out said belt from its stored position to extend said belt as said supports move apart whether said conveyor belt is driven or stationary.

13. A mobile conveyor mechanism comprising, in combination, a self-propelled head unit, a self-propelled rear unit trailing said head unit, an endless conveyor belt extending between and guided on said units, driving means engageable with said conveyor belt carried by one of said units for driving said belt, power operated take-up and storing means for said belt for taking up and storing a portion of said belt whereby the effective conveying portion of the latter may be shortened to decrease the length thereof as said units are moved apart, and means embodied in said units for steering the same as said units are propelled.

14. A portable extensible conveyor mechanism comprising, separate front and rear supports which are movable towards and from one another either independently of the other, an endless conveyor belt extending between said supports and movably supported and guided thereon, a storing means engageable with said belt for storing a variable portion of said conveyor belt whereby when said supports approach one another the slack portion of said belt is stored within said storing means, means for paying out said variable portion from said storing means as said supports move apart, and means engageable with said conveyor belt for continuously driving said conveyor belt including the periods said supports are moving as aforesaid.

15. A conveyor mechanism as set forth in claim 14 wherein said belt storing means is carried by one of said supports.

16. In a belt conveyor apparatus having an endless conveyor belt arranged to allow for extensibility, guiding means, a belt guiding mechanism movable along and guided by said guiding means and embodying at least one belt-guiding element, fluid operated means having portions acting in opposition for moving said mechanism in one direction or in the opposite direction, and means for connecting said opposed portions of said fluid operated means in communication with each other to permit fluid flow from one portion to the other and movement of said mechanism along said guiding means by traction exerted upon said belt, said connecting means including passage providing means for connecting with each of said opposed portions of said fluid operated means and having associated with it fluid-controlling means for imposing a predetermined resistance to movement of said mechanism by traction on said belt.

17. In a belt conveyor apparatus having an endless conveyor belt arranged to allow for extensibility, guiding means, a belt guiding mechanism movable along and guided by said guiding means embodying at least one belt-guiding element, traction means connected to said mechanism and having portions extending oppositely therefrom, extensible fluid operated power means having portions acting in opposition, one portion associated with each of said portions of said traction means for exerting traction thereon, and means for connecting said opposed portions of said extensible fluid operated power means in communication with each other to permit fluid flow from one portion to the other and movement of said mechanism along said guiding means by traction exerted on said belt, said connecting means including a passage providing means communicating with each of said portions of said extensible fluid operated power means and having associated with it flow controlling means for imposing a predetermined resistance to movement of said mechanism by traction on said belt.

18. In an extensible belt conveyor apparatus adapted to advance behind a mining machine as mining progresses, comprising, in combination, a mobile front end support, a mobile rear end support trailing behind said front support, an endless conveyor belt, guiding and reversing means carried by said supports, respectively, about which said belt passes with its upper effective conveying run extending longitudinally between said supports, means for storing a substantial portion of said belt as said supports are moved toward one another and for paying out the stored portion of said belt as said supports are moved apart whereby the effective length of said upper conveying run of said belt may be widly varied, said storing means including guiding and reversing means about which the stored portion of said belt extends in loops, and the guided relation of said belt about said guiding and reversing means of said supports and said storing means being maintained in all relative positions of said supports relative to one another whereby the conveyor belt may be operated at will.

19. An extensible belt conveyor apparatus as set forth in claim 18 wherein said endless conveyor belt is joined between its ends and is adapted to be taken apart to permit the insertion of an additional belt section and additional storing means is provided in the apparatus for storing an additional belt section and means is provided for effecting drawing in said additional belt section by said storing means when the joined ends of the belt are taken apart.

20. An extensible belt conveyor apparatus as set forth in claim 18 wherein said supports have propelling and steering means embodied in the apparatus whereby the apparatus may be propelled and steered as a self-contained unit while the relation of said endless belt with respect to said guiding and reversing means remains undisturbed.

21. An extensible belt conveyor apparatus as set forth in claim 18 wherein means is embodied in the apparatus for effecting control of movement of said mobile supports, control means for said storing and paying means is also provided, and means is embodied in the apparatus for coordinating said control means for said storing and paying means with said first mentioned control means whereby when said supports are relatively moved said storing paying out means is operated.

22. In an extensible belt conveyor including a tail pulley, a belt drive including at least one belt driving pulley, other pulleys of which a plurality are relatively fixed with reference to one of said two pulleys first mentioned and a plurality are bodily translationally movable with reference to one of said two pulleys first mentioned, an endless belt trained over and guided by said pulleys to provide a delivery run, a return run and a multiple take-up loop having more than two variable length belt portions therein, said take-up loop comprising the only direct connection between said other pulleys, means for yieldably biasing said plurality of movable pulleys away from said plurality of relatively fixed pulleys to permit the length of each of said belt portions in said take-up loop to be varied during orbital movement of said belt, said tail pulley and said belt drive having separate means for supporting them with respect to a surface between points on which it is desired to move material, each of said separate supporting means has means associated with it for effecting translational movement thereof, and said means for biasing said plurality of movable pulleys including means to permit the reduction in total length of said belt in said variable length belt portions as separation between said separate supporting means takes place.

23. In an extensible belt conveyor including a tail pulley, a belt drive including at least one belt driving pulley, other pulleys of which a plurality are relatively fixed with reference to one of said two pulleys first mentioned and a plurality are bodily translationally movable with reference to one of said pulleys first mentioned, an endless belt trained over and guided for orbital movement by said pulleys to provide a delivery run, a return run and a multiple take-up loop having more than two variable length belt portions therein, said take-up loop comprising the only direct connection between said other pulleys, means for yieldably biasing said plurality of movable pulleys away from said plurality of fixed pulleys to permit the length of each of said belt portions in said take-up loop to be varied during orbital movement of said belt, said tail pulley and said belt drive having separate means for supporting them with respect to a surface between points on which it is desired to move material, each of said separate supporting means has means associated with it for effecting translational movement thereof, said means for biasing said plurality of movable pulleys including means to permit the reduction in total length of said variable length portions of said belt as separation between said separate supporting means takes place and said last mentioned means being supported on one of said separate supporting means and receiving controlling force from the other of said supporting means through the portion of said belt extending between said separate supporting means.

24. A storage device for an extensible conveyor belt to permit variations in the effective conveying length thereof comprising, a frame having a first plurality of roller means mounted thereon for rotation with respect thereto, a take-up means including a second plurality of rotatable roller means bodily movable in opposite directions with respect to said first plurality of roller means, said first and second pluralities of roller means having end roller means, respectively, which are spaced from each other in a direction in which said movements occur with all other of said roller means located therebetween, and each of said end roller means being located to support a pair of elongated runs of a conveyor belt which are laterally spaced from each other so that all other roller means of the same plurality of which said end roller means constitutes a portion are located therebetween.

25. A storage device for an extensible conveyor belt to permit variations in the effective conveying length thereof comprising, a frame having a first plurality of roller means mounted thereon for rotation with respect thereto, a take-up means including a second plurality of rotatable roller means bodily movable in opposite directions with respect to said first plurality of roller means, said first and second pluralities of roller means having end roller means, respectively, which are spaced from each other in a direction in which said movements occur with all other of said roller means located therebetween, each of said end roller means being located to support a pair of elongated runs of a conveyor belt which are laterally spaced from each other so that all other roller means of the same plurality of which said end roller means constitutes a portion are located therebetween, and means connected to said take-up means to yieldably maintain said second plurality of roller means in any desired position with respect to said frame.

26. A storage device for an extensible conveyor belt to permit variations in the effective conveying length thereof comprising, a frame having a first plurality of roller means mounted thereon for rotation with respect thereto, a take-up means including a second plurality of rotatable roller means bodily movable in opposite directions along a path with relation to said first plurality of roller means, said first and second pluralities of roller means having end roller means, respectively, which are spaced from each other along said path with all other of said roller means being located therebetween, and each of said end roller means being located to support a pair of elongated runs of a conveyor belt which are laterally spaced from each other so that all other roller means of the same plurality of which said end roller means constitutes a portion are located therebetween.

27. A storage device for an extensible conveyor belt to permit variations in the effective conveying length thereof comprising, a frame having a first plurality of roller means mounted thereon for rotation with respect thereto, a take-up means including a second plurality of rotatable roller means bodily movable in opposite directions along a path with relation to said first plurality of roller means, said first and second pluralities of roller means having end roller means, respectively, which are spaced from each other along said path with all other of said roller means being located therebetween, each of said end roller means being located to support a pair of elongated runs of a conveyor belt which are laterally spaced from each other so that all other roller means of the same plurality of which said end roller means constitutes a portion are located therebetween, and a mechanism connected to said take-up means to yieldably maintain said second belt supporting means in any desirable portion of an infinite number of positions along said path with respect to said frame.

28. A storage device for an extensible conveyor belt to permit variations in the effective conveying length thereof comprising, a frame having a first plurality of roller means mounted thereon for rotation with respect thereto, a take-up means including a second plurality of rotatable roller means bodily movable in opposite directions along a path with relation to said first plurality of roller means, said first and second pluralities of roller means having end roller means, respectively, which are spaced from each other along said path with all other of said roller means being located therebetween, and each of said end roller means being located to support a pair of elongated runs of a conveyor belt which are laterally spaced from each other so that all other roller means of the same plurality of which said end roller means constitutes a portion are located therebetween, a mechanism connected to said take-up means to yieldably maintain said second belt support means in any desirable position of an infinite number of positions along said path with respect to said frame, and means connected to said mechanism for controlling the movement thereof including means to obtain uniform tension in a belt supported by said first and second belt plurality of roller means.

29. A storage device for an extensible conveyor belt to permit variations in the effective conveying length thereof comprising, a frame having a first plurality of roller means mounted thereon for rotation with respect thereto, a take-up means including a second plurality of rotatable roller means bodily movable in opposite directions with respect to said first plurality of roller means, said first and second pluralities of roller means having end roller means, respectively, which are spaced from each other in a direction in which said movements occur with all other of said roller means located therebetween, each of said end roller means being located to support a pair of elongated runs of a conveyor belt which are laterally spaced from each other so that all other roller means of the same plurality of which said end roller means constitutes a portion are located therebetween, and means engageable with a conveyor belt for driving same in any relative position of said frame and take-up means and whether said frame and take-up means are relatively stationary or said take-up means is moving.

References Cited in the file of this patent
UNITED STATES PATENTS

| | | |
|---|---|---|
| 642,175 | Titus | Jan. 30, 1900 |
| 1,453,393 | Jessen | May 1, 1923 |
| 1,748,301 | McKinlay | Feb. 25, 1930 |
| 1,817,348 | Claghorn | Aug. 4, 1931 |
| 2,452,980 | Beltz | Nov. 2, 1948 |
| 2,507,341 | Lee | May 9, 1950 |
| 2,576,217 | Eggleston | Nov. 27, 1951 |
| 2,640,582 | Madeira | June 2, 1953 |
| 2,678,125 | Bonney | May 11, 1954 |